US011425741B2

(12) United States Patent
Akula et al.

(10) Patent No.: US 11,425,741 B2
(45) Date of Patent: *Aug. 23, 2022

(54) TIME MASK TECHNIQUES FOR SHORTENED TRANSMISSION TIME INTERVALS

(71) Applicant: QUALCOMM Incorporated, San Diego, CA (US)

(72) Inventors: Prashanth Akula, Lake Bluff, IL (US); Seyedkianoush Hosseini, San Diego, CA (US); Wanshi Chen, San Diego, CA (US); Amir Farajidana, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/449,087

(22) Filed: Jun. 21, 2019

(65) Prior Publication Data

US 2019/0313431 A1  Oct. 10, 2019

Related U.S. Application Data

(63) Continuation of application No. 15/885,298, filed on Jan. 31, 2018, now Pat. No. 10,368,365.

(Continued)

(51) Int. Cl.
*H04W 72/12* (2009.01)
*H04W 72/04* (2009.01)
(Continued)

(52) U.S. Cl.
CPC .......... *H04W 72/1268* (2013.01); *H04B 1/04* (2013.01); *H04W 52/0216* (2013.01);
(Continued)

(58) Field of Classification Search
None
See application file for complete search history.

(56) References Cited

U.S. PATENT DOCUMENTS 8,824,421 B2 * 9/2014 Cho .................... H04W 72/042
  370/335
9,144,037 B2    9/2015 Seong et al.
(Continued)

FOREIGN PATENT DOCUMENTS

CN    103974406 A    8/2014
CN    106256108 A    12/2016
(Continued)

OTHER PUBLICATIONS

U.S. Appl. No. 62/455,435, filed Feb. 6, 2017, Rahman et al., "Adapting UE ON/OFF Transient Time Parameter for Different Transmission Time Interval Patterns", p. 1-46 & Fig. 1-15.*
(Continued)

*Primary Examiner* — Gregory B Sefcheck
(74) *Attorney, Agent, or Firm* — Holland & Hart LLP

(57) ABSTRACT

Methods, systems, and devices for wireless communication are described that support time mask techniques for shortened transmission time intervals (sTTIs) that may enhance low latency communications. Time masks may be identified and applied for transmissions that use sTTIs, in a manner that provides increased portions of sTTI durations having higher transmission power, and thus increase the likelihood of successful reception of such transmissions at a receiver. In some cases, a transmitter, such as a user equipment (UE), may identify one or more sTTIs for transmissions of a first wireless service (e.g., an ultra-reliable low-latency communication (URLLC) service). An sTTI may be identified based on a duration of a TTI associated with the first wireless (Continued)

service being below a threshold duration (e.g., a TTI duration of less than 1 ms may be identified as an sTTI).

30 Claims, 15 Drawing Sheets

Related U.S. Application Data

(60) Provisional application No. 62/453,996, filed on Feb. 2, 2017.

(51) Int. Cl.
 *H04B 1/04* (2006.01)
 *H04W 52/02* (2009.01)
 *H04W 52/34* (2009.01)

(52) U.S. Cl.
 CPC ..... *H04W 52/346* (2013.01); *H04W 72/0446* (2013.01); *H04B 2001/0416* (2013.01); *Y02D 30/70* (2020.08)

(56) References Cited

U.S. PATENT DOCUMENTS

| | | | |
|---|---|---|---|
| 9,516,692 B2 | 12/2016 | Kwong et al. | |
| 10,027,462 B2 | 7/2018 | Jiang et al. | |
| 10,033,488 B2 | 7/2018 | Loehr et al. | |
| 10,064,165 B2 | 8/2018 | Xu et al. | |
| 10,172,130 B2 | 1/2019 | Chen et al. | |
| 10,200,168 B2* | 2/2019 | Liu | H04L 1/0003 |
| 10,225,065 B2 | 3/2019 | Ang et al. | |
| 10,367,630 B2* | 7/2019 | Byun | H04W 72/0446 |
| 10,368,365 B2* | 7/2019 | Akula | H04W 52/346 |
| 10,420,079 B2* | 9/2019 | Yang | H04L 5/0092 |
| 10,420,080 B2* | 9/2019 | Yang | H04W 72/042 |
| 10,484,989 B2* | 11/2019 | Kim | H04L 5/0091 |
| 10,523,395 B2* | 12/2019 | Kim | H04W 72/04 |
| 10,616,835 B2* | 4/2020 | Kwak | H04L 5/0082 |
| 10,785,011 B2* | 9/2020 | Hooli | H04L 1/1812 |
| 10,862,640 B2* | 12/2020 | Akula | H04L 5/0051 |
| 10,932,198 B2* | 2/2021 | Seo | H04L 1/0013 |
| 10,985,959 B2* | 4/2021 | Rahman | H04L 5/0048 |
| 10,985,966 B2* | 4/2021 | Horiuchi | H04L 29/06 |
| 11,115,979 B2* | 9/2021 | Åhlander et al. | H04W 52/0216 |
| 2009/0034598 A1 | 2/2009 | Catreux-Erceg | |
| 2014/0293843 A1 | 10/2014 | Papasakellariou et al. | |
| 2015/0031410 A1 | 1/2015 | Lim et al. | |
| 2015/0215887 A1 | 7/2015 | Nejatian et al. | |
| 2015/0263830 A1 | 9/2015 | Li et al. | |
| 2015/0289243 A1 | 10/2015 | Shi et al. | |
| 2016/0234857 A1 | 8/2016 | Chen et al. | |
| 2016/0381490 A1 | 12/2016 | Rico et al. | |
| 2017/0013618 A1 | 1/2017 | Shin | |
| 2017/0027017 A1 | 1/2017 | Black et al. | |
| 2017/0048038 A1 | 2/2017 | Seo et al. | |
| 2017/0111923 A1 | 4/2017 | Nogami et al. | |
| 2017/0272299 A1 | 9/2017 | Chae et al. | |
| 2017/0290008 A1 | 10/2017 | Tooher et al. | |
| 2017/0325246 A1 | 11/2017 | Agarwal et al. | |
| 2018/0049165 A1 | 2/2018 | Byun et al. | |
| 2018/0077721 A1 | 3/2018 | Nory et al. | |
| 2018/0110062 A1 | 4/2018 | Byun et al. | |
| 2018/0139083 A1* | 5/2018 | Hosseini | H04L 27/2613 |
| 2018/0145857 A1 | 5/2018 | Kim et al. | |
| 2018/0294942 A1* | 10/2018 | Byun | H04L 5/1469 |
| 2019/0020459 A1* | 1/2019 | Hooli | H04L 1/1812 |
| 2019/0036758 A1* | 1/2019 | Takeda | H04W 72/042 |
| 2021/0021454 A1* | 1/2021 | Horiuchi | H04W 52/346 |
| 2021/0282170 A1* | 9/2021 | Falconetti | H04W 72/1278 |

FOREIGN PATENT DOCUMENTS

| | | |
|---|---|---|
| WO | WO-2015167289 A1 | 11/2015 |
| WO | WO-2016036141 A1 | 3/2016 |

OTHER PUBLICATIONS

International Search Report and Written Opinion—PCT/US2018/016474—ISA/EPO—dated May 11, 2018 (171635WO).
Taiwan Search Report—TW107103598—TIPO—dated Jun. 4, 2021 (171635TW).

* cited by examiner

TIME MASK TECHNIQUES FOR SHORTENED TRANSMISSION TIME INTERVALS

CROSS REFERENCES

The present Application for Patent claims priority to U.S. patent application Ser. No. 15/885,298, now U.S. Pat. No. 10,368,365, by Akula et al., entitled "Time Mask Techniques For Shortened Transmission Time Intervals," filed Jan. 31, 2018, and U.S. Provisional Patent Application No. 62/453, 996 by Akula et al., entitled "Time Mask Techniques For Shortened Transmission Time Intervals," filed Feb. 2, 2017, assigned to the assignee hereof.

BACKGROUND

The following relates generally to wireless communication, and more specifically to time mask techniques for shortened transmission time intervals.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTI) that may be reduced in length relative to legacy LTE TTIs. Such a reduced length TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time resources, frequency resources, and one or more component carriers (CCs) to be used for sTTI transmissions. Efficient use of such resources for data, control information, and reference signal transmissions may help to increase the efficiency of a wireless communications system.

SUMMARY

The described techniques relate to improved methods, systems, devices, or apparatuses that support time mask techniques for shortened transmission time intervals (sTTIs) that may enhance low latency communications. Generally, the described techniques provide for identifying and applying time masks for transmissions that use sTTIs in a manner that provides increased portions of sTTI durations that have higher transmission power, and thus increase the likelihood of successful reception of such transmissions at a receiver. In some cases, a transmitter, such as a user equipment (UE), may identify one or more sTTIs for transmissions of a first wireless service (e.g., an ultra-reliable low-latency communication (URLLC) service). An sTTI may be identified based on a duration of a TTI associated with the first wireless service being below a threshold duration (e.g., a TTI duration of less than 1 ms may be identified as an sTTI).

In some cases, transient periods for switching a transmitter from an OFF-state to an ON-state, and for switching the transmitter from the ON-state to the OFF-state may be identified and applied as time masks (e.g., an OFF-ON mask or an ON-OFF mask) for a TTI based on the identified TTI duration. In some examples, OFF-ON and ON-OFF masks may be applied to an sTTI to provide that the transient periods occur outside of the sTTI duration. In some examples, such masks may be applied to TTIs having a duration at or above the threshold duration to provide that at least a portion of one or more transient periods may occur within the TTI duration. In some cases, two or more consecutive sTTIs may be transmitted in which different transmit ON powers may be used, and a transient period associated with a transition from a first transmit ON power to a second transmit ON power may span a boundary between consecutive sTTIs.

A method of wireless communication is described. The method may include identifying a first transient period between a transmit OFF power and transmit ON power for a wireless transmitter, the first transient period identified for a first transmission time interval (TTI) for an uplink transmission of the wireless transmitter, the first TTI having a first duration that is shorter than a threshold duration, identifying a second transient period between the transmit ON power and transmit OFF power for the wireless transmitter, applying the first transient period as an OFF-ON mask that starts before a start of the first TTI, applying the second transient period as an ON-OFF mask that ends after an end of the first TTI, and transmitting the uplink transmission during the TTI.

An apparatus for wireless communication is described. The apparatus may include means for identifying a first transient period between a transmit OFF power and transmit ON power for a wireless transmitter, the first transient period identified for a first TTI for an uplink transmission of the wireless transmitter, the first TTI having a first duration that is shorter than a threshold duration, means for identifying a second transient period between the transmit ON power and transmit OFF power for the wireless transmitter, means for applying the first transient period as an OFF-ON mask that starts before a start of the first TTI, means for applying the second transient period as an ON-OFF mask that ends after an end of the first TTI, and means for transmitting the uplink transmission during the TTI.

Another apparatus for wireless communication is described. The apparatus may include a processor, memory in electronic communication with the processor, and instructions stored in the memory. The instructions may be operable to cause the processor to identify a first transient period between a transmit OFF power and transmit ON power for a wireless transmitter, the first transient period identified for a first TTI for an uplink transmission of the wireless transmitter, the first TTI having a first duration that is shorter than a threshold duration, identify a second transient period between the transmit ON power and transmit OFF power for the wireless transmitter, apply the first transient period as an OFF-ON mask that starts before a start of the first TTI, apply the second transient period as an ON-OFF mask that ends after an end of the first TTI, and transmit the uplink transmission during the TTI.

A non-transitory computer readable medium for wireless communication is described. The non-transitory computer-readable medium may include instructions operable to cause a processor to identify a first transient period between a transmit OFF power and transmit ON power for a wireless transmitter, the first transient period identified for a first TTI for an uplink transmission of the wireless transmitter, the first TTI having a first duration that is shorter than a threshold duration, identify a second transient period between the transmit ON power and transmit OFF power for the wireless transmitter, apply the first transient period as an OFF-ON mask that starts before a start of the first TTI, apply the second transient period as an ON-OFF mask that ends after an end of the first TTI, and transmit the uplink transmission during the TTI.

DETAILED DESCRIPTION

Figure 1:
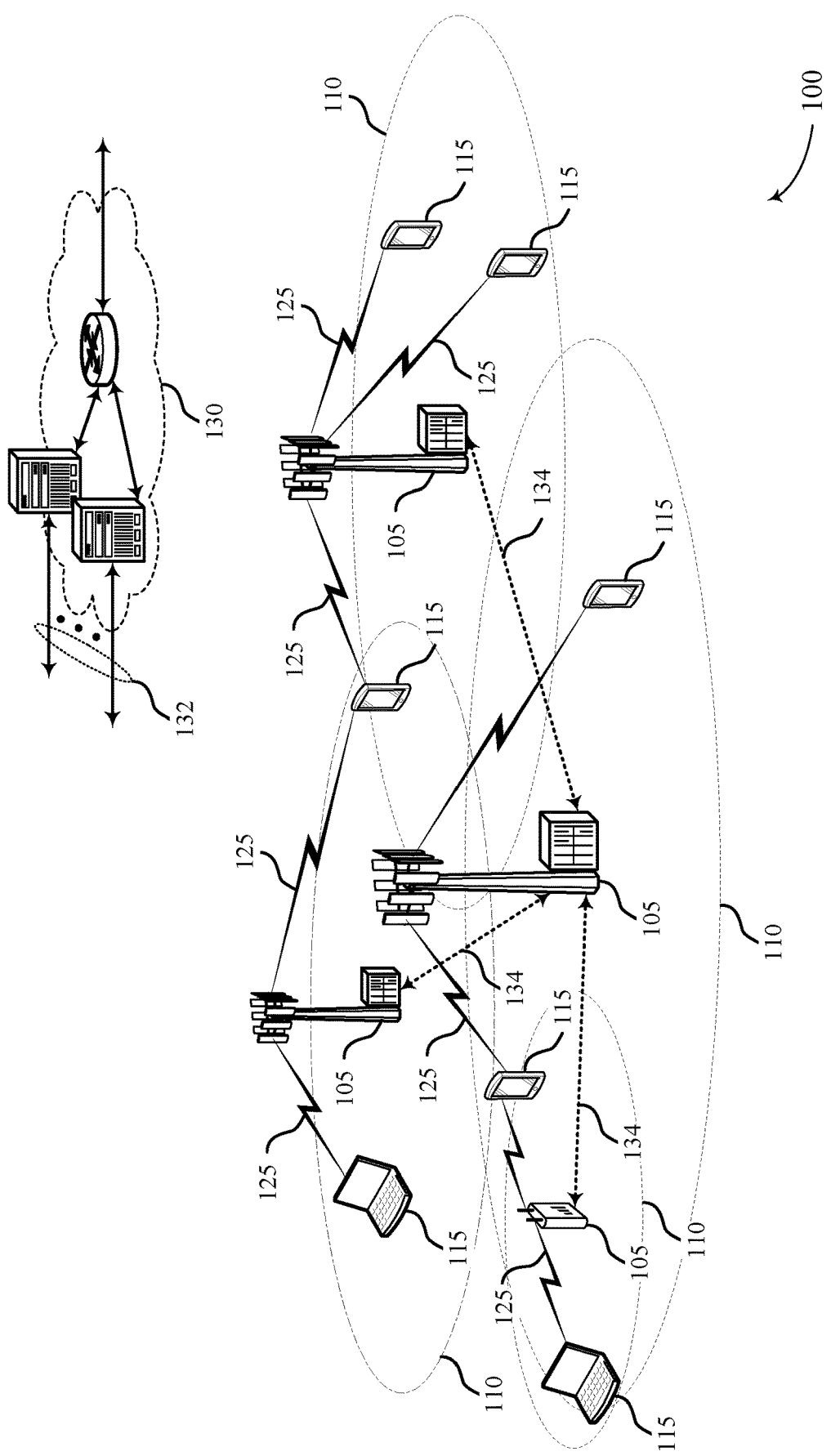
FIG. 1 illustrates an example of a system for wireless communication that supports time mask techniques for shortened transmission time intervals in accordance with aspects of the present disclosure.

Improved methods, systems, devices, or apparatuses of various examples may be used to support time mask techniques for shortened transmission time intervals (sTTIs) that may enhance low latency communications. Resources allocated for low latency communication may be used for uplink and downlink communication using sTTIs that have a reduced length relative to TTIs of communications that may be relatively latency insensitive, such as enhanced mobile broadband (eMBB) transmissions that may use a 1 ms TTI duration. Communications using sTTIs may use, in some cases, an sTTI duration that corresponds to one slot of a wireless subframe, or an sTTI duration that corresponds to two or three orthogonal frequency division multiplexing (OFDM) symbols. In some cases, sTTIs may be configured to have boundaries within, or, aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Various techniques as disclosed herein may provide for identifying and applying time masks for transmissions that use sTTIs in a manner that provides increased portions of sTTI durations that have higher transmission power, and thus increase the likelihood of successful reception of such transmissions at a receiver. In some cases, a transmitter, such as a user equipment (UE), may identify one or more sTTIs for transmissions of a first wireless service (e.g., an ultra-reliable low-latency communication (URLLC) service). A sTTI may be identified based on a duration of a TTI associated with the first wireless service being below a threshold duration (e.g., a TTI duration of less than 1 ms may be identified as a sTTI).

In some cases, transient periods for switching a transmitter from an OFF-state to an ON-state, and for switching the transmitter from the ON-state to the OFF-state, may be identified and applied as time masks (e.g., an OFF-ON mask or an ON-OFF mask) for a TTI based on the identified TTI duration. In some examples, OFF-ON and ON-OFF masks may be applied to an sTTI to provide that the transient periods occur outside of the sTTI duration. In some examples, such masks may be applied to TTIs having a duration at or above the threshold duration to provide that at least a portion of one or more transient periods may occur within the TTI duration. In some cases, two or more consecutive sTTIs may be transmitted in which different transmit ON powers may be used, and a transient period associated with a transition from a first transmit ON power to a second transmit ON power may span a boundary between consecutive sTTIs.

In some cases, low latency communications using sTTIs may be used in systems, for example, that may support multiple different services for data communications. Different services may be selected depending upon the nature of the communications. For instance, communications that require low latency and high reliability, sometimes referred to as mission critical (MiCr) communications, may be served through a lower-latency service (e.g., a URLLC service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Various examples of transient periods and time masks for different TTIs are then discussed. Aspects of the disclosure are further illustrated by and described with reference to apparatus diagrams, system diagrams, and flowcharts that relate to time mask techniques for shortened transmission time intervals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices. Transmissions between base stations 105 and UEs 115 may use sTTIs associated with low latency communications according to techniques as discussed herein.

Base stations 105 may wirelessly communicate with UEs 115 via one or more base station antennas. Each base station 105 may provide communication coverage for a respective geographic coverage area 110. The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC). Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and sTTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing.

A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC. Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Time intervals in LTE or NR may be expressed in multiples of a basic time unit (which may be a sampling period of $T_s=1/30,720,000$ seconds). Time resources in LTE/LTE-A may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in sTTI bursts or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

Various examples discussed herein provide transmission techniques for shortened TTIs, which may provide transient period time masks outside of a sTTI duration so as to provide sTTI transmissions with relatively small impacts from transients associated with powering on or powering off a transmitter.

Figure 2:
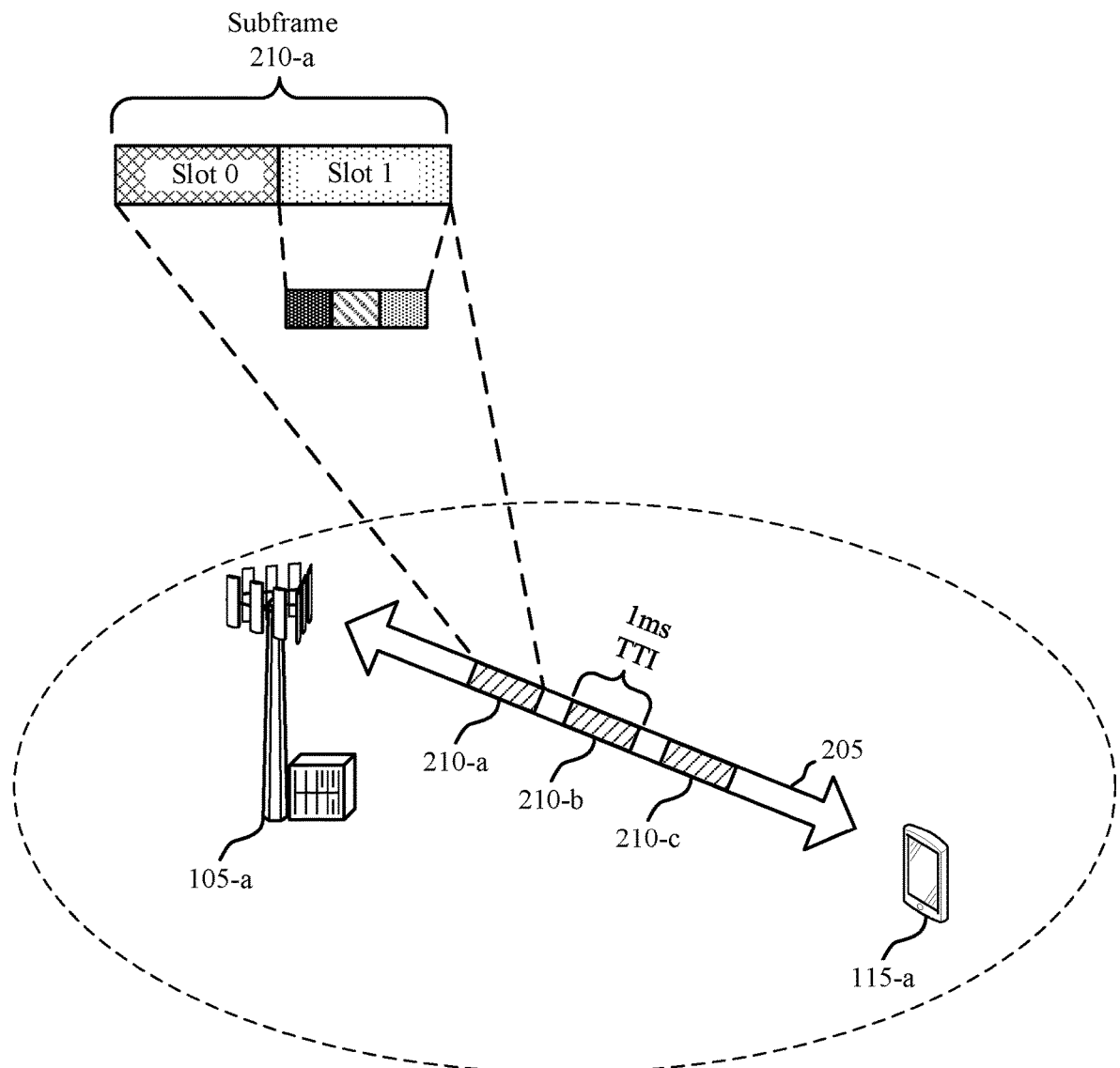
FIG. 2 illustrates an example of a wireless communication system that supports time mask techniques for shortened transmission time intervals in accordance with aspects of the present disclosure.
Figure 2:
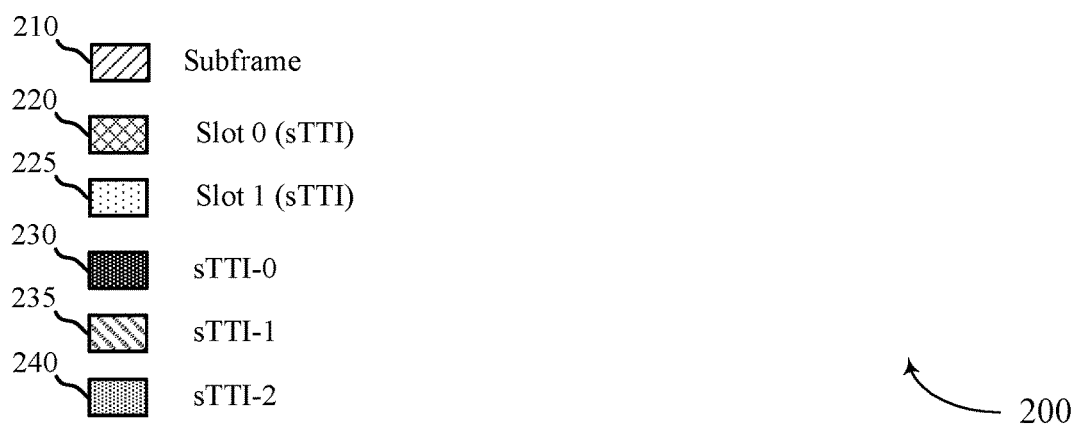

FIG. 2 illustrates an example of a wireless communications system 200 that supports time mask techniques. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over carrier 205. In some examples, base station 105-a may allocate resources for communication with UEs over carrier 205. For example, base station 105-a may allocate subframes 210 (e.g., subframe 210-a, subframe 210-b, and/or subframe 210-c) for communication with UE 115-a, and one or more subframes 210 may correspond to a legacy LTE TTI having a TTI length of 1 ms. Each of the subframes 210 may include two slots, in which each slot may have seven symbols for a normal cyclic prefix. In this example, the first subframe 210-a may include resources for sTTI transmissions (e.g., for mission critical transmissions of a service such as URLLC uses sTTIs), and the second subframe 210-b may include resources for a 1 ms TTI (e.g., for a legacy LTE transmission or a transmission of a service such as eMBB that uses 1 ms TTIs).

The first subframe 210-a of this example includes a first slot (slot 0) 220 and a second slot (slot 1) 225. As indicated above, in the uplink of a low latency system, different sTTI lengths may be used for transmissions over carrier 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (sTTI-0) 230, a second sTTI (sTTI-1) 235, and a third sTTI (sTTI-2) 240, that may each have a duration of two or three OFDM symbols.

In some cases, when a two-symbol or three-symbol sTTI is used, it may be desirable to have a fixed sTTI structure in which sTTI boundaries lie within slot boundaries, or are aligned with slot boundaries, such as the boundaries of the first slot 220 or second slot 225, which may be referred to as slot-aligned sTTIs. As discussed above, when using a normal CP, seven symbols are included in each slot 220-225, and thus each slot may include three sTTIs for slot-aligned sTTIs.

As discussed herein, in some examples time masks may be applied differently for sTTIs and for 1 ms TTIs. In legacy LTE, all or a portion of a transient period between when a transmitter is powered on until the transmitter is able to transmit at the configured power may be included within a 1 ms TTI. In such cases, initial portions of a TTI may have a lower likelihood of being successfully received at a receiver, due to the transmit power not being fully ramped up by the time of transmission of such initial portions. In some deployments, a transient time of 20 μs may be present for an ON-OFF or OFF-ON transition. In cases where a TTI is 1000 μs, having such a transient period within the TTI may result in up to 2% of the 1 ms TTI duration being impacted by these transient periods. However, when a transmitter is transmitting sTTIs, the impact of such a transient period may be greater. For example, if a 2-symbol sTTI is being used, a 20 μs transient period starting concurrently with a start of the sTTI may result in greater than 10% of the sTTI duration being impacted by such a transient period. In some examples, transient periods for devices that may transmit using sTTIs may be specified to be shorter than the legacy LTE transient periods, such as 10 μs, for example. In further examples, time masks for transient periods may be applied so as to ensure such transient periods occur outside of a duration of a sTTI. In such cases, the impact of transient periods on sTTI transmissions may be reduced, which may increase the likelihood of successful reception of sTTIs at a receiver.

Figure 3:
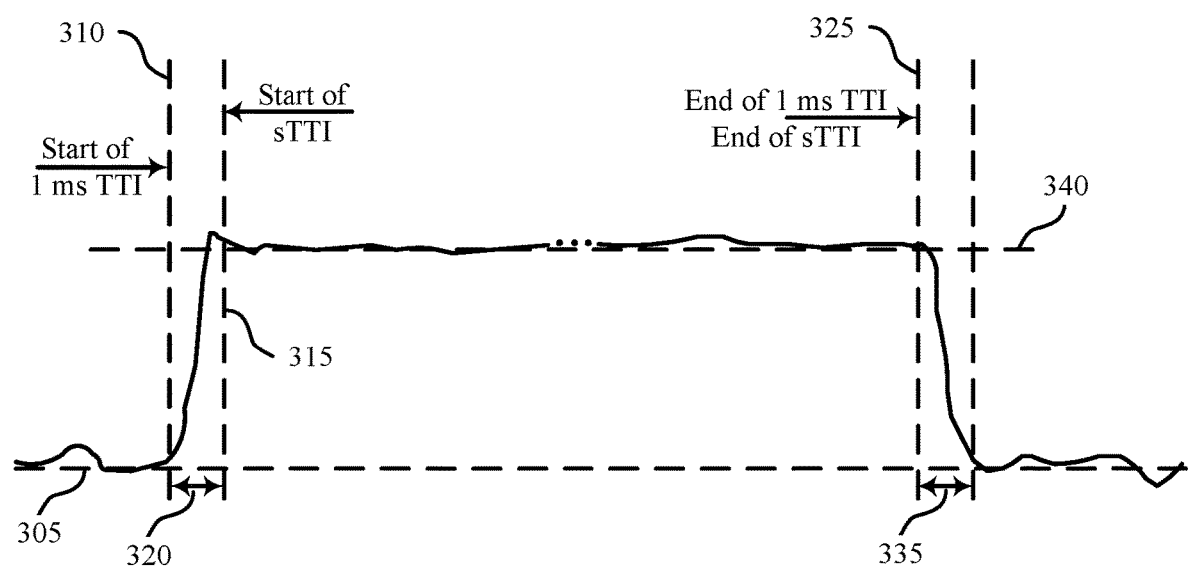
FIG. 3 illustrates an example of an OFF-ON transient and ON-OFF transient that supports time mask techniques for shortened transmission time intervals in accordance with aspects of the present disclosure.

FIG. 3 illustrates an example of wireless resources 300, and OFF-ON transient and ON-OFF transient time masks for shortened transmission time intervals. The wireless resources 300 may be used, for example, in sTTI transmissions for low latency communications between a UE and a base station such as discussed above with respect to FIGS. 1 and 2. In the example of FIG. 3, a transmitter power may change from an OFF-state with nominal off power level 305 to an ON-state with nominal on power level 340. A first transient period 320 may correspond to a period for the transmitter to switch from the off power level 305 to the on power level 340. A second transient period 335 may correspond to a period for the transmitter to switch from the on power level 340 to the off power level 305.

As indicated above, in some cases, if a transmission uses sTTIs, transient periods may be masked so as to provide the transients outside of a duration of the sTTI, and if a transmission uses 1 ms TTIs, transient periods may be masked so as to provide some portion of the transients inside of a duration of the sTTI. In the example of FIG. 3, a start of a 1 ms TTI 310 may correspond to the start of the first transient period 320, and thus the OFF-ON transient will occur within such a 1 ms TTI. In this example, the start of a sTTI 315 may correspond to an end of the first transient period 320, and thus the OFF-ON transient does not occur within such a sTTI. In this example, the second transient period 335 may start at an end of both the 1 ms TTI and the sTTI 325. The entire ON-OFF transient thus occurs outside of both a 1 ms TTI and an sTTI. In some cases, a time of 20 μs may be allocated for both the first transient period 320 and the second transient period 335. In other cases, different transient times (e.g., 10 μs) may be allocated for one or both of the first transient period 320 or the second transient period 335.

Figure 4:
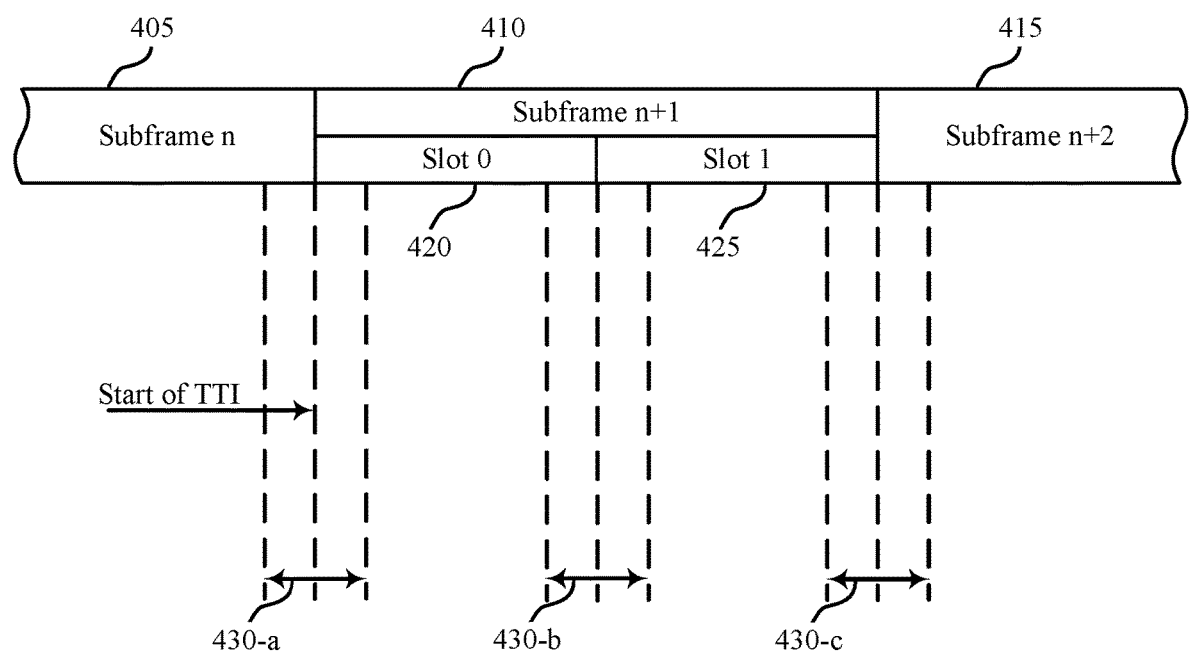
FIG. 4 illustrates an example of consecutive TTI transmissions that support time mask techniques for shortened transmission time intervals in accordance with aspects of the present disclosure.

FIG. 4 illustrates an example of consecutive TTI transmissions 400 that support time mask techniques. The consecutive TTI transmissions 400 may be used, for example, in sTTI transmissions for low latency communications between a UE and a base station such as discussed above with respect to FIGS. 1 and 2. In the example of FIG. 4, a first subframe 405 (subframe n), a second subframe 410 (subframe n+1), and a third subframe 415 (subframe n+2), may be allocated for 1 ms TTI uplink transmissions. In such cases, the different TTIs may have different uplink resources, such as different frequency resources, different transmission powers, or combinations thereof. In some cases, if a 1 ms TTI is being used, a 20 μs transition time between consecutive TTIs may be provided. In the event that an sTTI is being used for transmissions, a same transition time or a shorter transition time may be allocated. For sTTI transmissions, since the actual transmission time itself is smaller, a reduced transition time between consecutive sTTIs may be beneficial to help improve throughput and quality of demodulation.

In the example of FIG. 4, the second subframe 410 may include a first slot 420 (slot 0) and a second slot 425 (slot 1), and one or more boundary transient periods 430 may be specified at slot boundaries. In this example, first boundary transient period 430-a may span the start of the TTI associated with the first slot 420 of the second subframe 410, a second boundary transient period 430-b may span the first slot 420 and the second slot 425, and a third boundary transient period 430-c may span the end of the second subframe 410 and the beginning of the third subframe 415. In some cases, the consecutive TTI transmissions 400 may include consecutive sTTI transmissions (e.g., each slot of the subframes 405, 410, and/or 415 may be a separate sTTI), and the boundary transient behavior of each sTTI may be constrained, either within a specified duration (e.g., within X μs), or within the middle of a specified duration (e.g., within the middle of 2X μs). In some examples, boundary transitions may also be left to network implementation and may be signaled to a UE.

Figure 5:
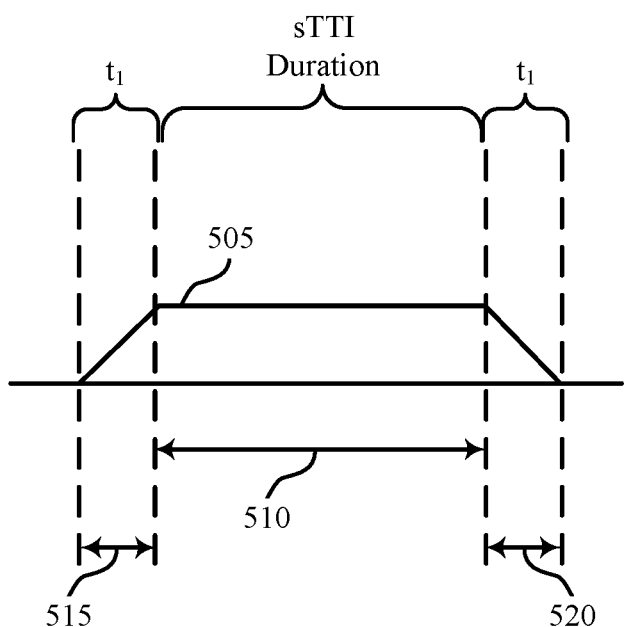
FIG. 5 illustrates an example of sTTI time masks that support time mask techniques for shortened transmission time intervals in accordance with aspects of the present disclosure.

FIG. 5 illustrates an example of sTTI time masks 500 that support time mask techniques. The sTTI time masks 500 may be used, for example, in sTTI transmissions for low latency communications between a UE and a base station such as discussed above with respect to FIGS. 1 and 2. In the example of FIG. 5, an sTTI transmission 505 may span a sTTI duration 510, such as a 2-symbol sTTI, a 3-symbol sTTI, a slot sTTI, etc. An OFF-ON mask 515 may be applied before the start of the sTTI duration 510 and may span a first transient period $t_1$, which may correspond to an OFF-ON transient period for a UE. Likewise, an ON-OFF mask 520 starting at an end of the sTTI duration 510 and spanning the first transient period $t_1$, which may correspond to an ON-OFF transient period for a UE, may be applied. Thus, both the OFF-ON mask 515 and the ON-OFF mask 520 may be outside the sTTI duration 510. In this example, the transient period $t_1$ is the same for both the OFF-ON mask 515 and the ON-OFF mask 520, although these may be different in other examples. In some cases, the transient period $t_1$ may be a fixed value (e.g., 20 μs), and in other cases, the transient period $t_1$ may be a function of the bandwidth used for the uplink transmission. For example, if the uplink transmission bandwidth is greater than or equal to a threshold bandwidth (e.g., 1.4 MHz, 5 MHz, etc.), a first value (e.g., 10 µs) may be used for the transient period $t_1$, and if the uplink transmission bandwidth is less than the threshold bandwidth (e.g., 1.4 MHz, 5 MHz, etc.), a second value (e.g., 20 µs) may be used for the transient period $t_1$.

Figure 6:
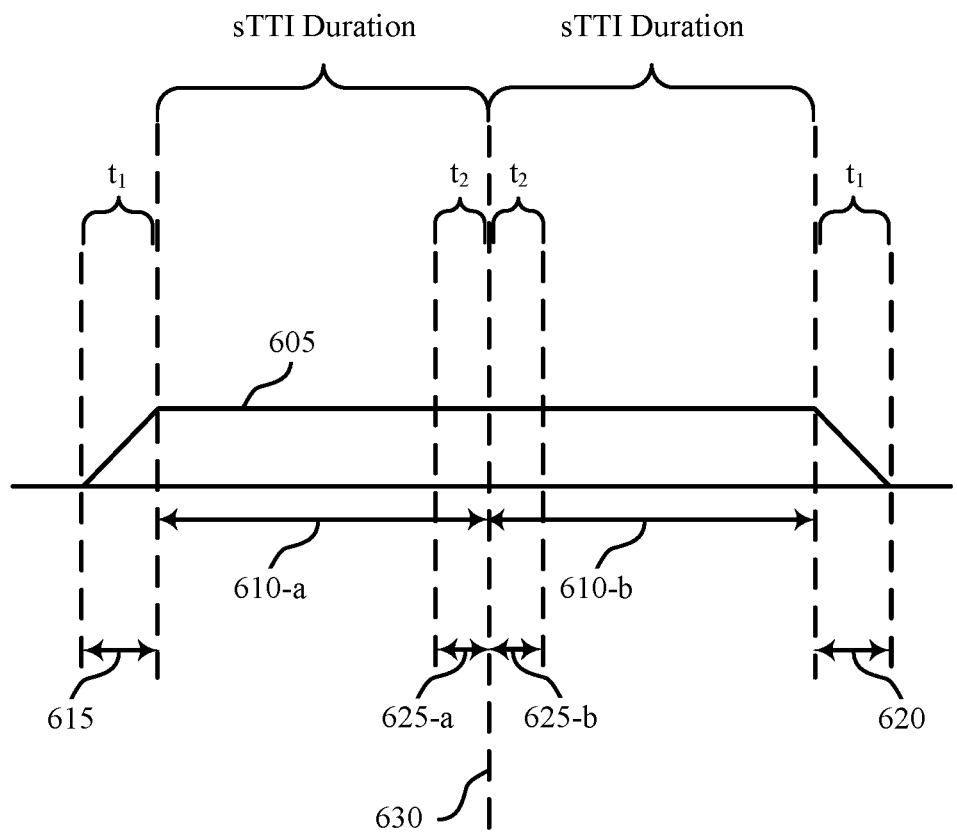
FIG. 6 illustrates an example of consecutive sTTI time masks that support time mask techniques for shortened transmission time intervals in accordance with aspects of the present disclosure.

FIG. 6 illustrates an example of consecutive sTTI time masks 600 for time mask techniques. The sTTI time masks 600 may be used, for example, in sTTI transmissions for low latency communications between a UE and a base station such as discussed above with respect to FIGS. 1 and 2. In the example of FIG. 6, an sTTI transmission 605 may span multiple sTTI durations 610. An OFF-ON mask 615 may be applied before the start of the sTTI transmission 605 and may span a first transient period $t_1$, which may correspond to an OFF-ON transient period for a UE. Likewise, an ON-OFF mask 620 may be applied starting at an end of the sTTI transmission 605, and may span the first transient period $t_1$, which may correspond to an ON-OFF transient period for a UE. Thus, both the OFF-ON mask 615 and the ON-OFF mask 620 may be outside the sTTI durations 610.

In this example, a boundary 630 between the first sTTI duration 610-a and the second sTTI duration 610-b may be identified, and a boundary time mask 625 may be applied at the boundary 630. In some cases, the boundary time mask 625 may include a first boundary transient period 625-a and a second transient period 625-b, each of which may have a duration of $t_2$, and may span boundary 630 to provide a total boundary transient period of $2*t_2$. In some cases, the first and second transient periods 625 may have a duration of about 10 µs. In some cases, the first and second transient periods 625 may be identified only if a power allocation, frequency allocation, or both, change across the two sTTI durations 610. In some cases, the transient behavior of each sTTI may be constrained either within a specified duration (e.g., within X µs), or within the middle of a specified duration (e.g., within the middle of 2X µs). Such boundary transitions may also be left to network implementation and may be signaled to a UE, in some examples.

Figure 7:
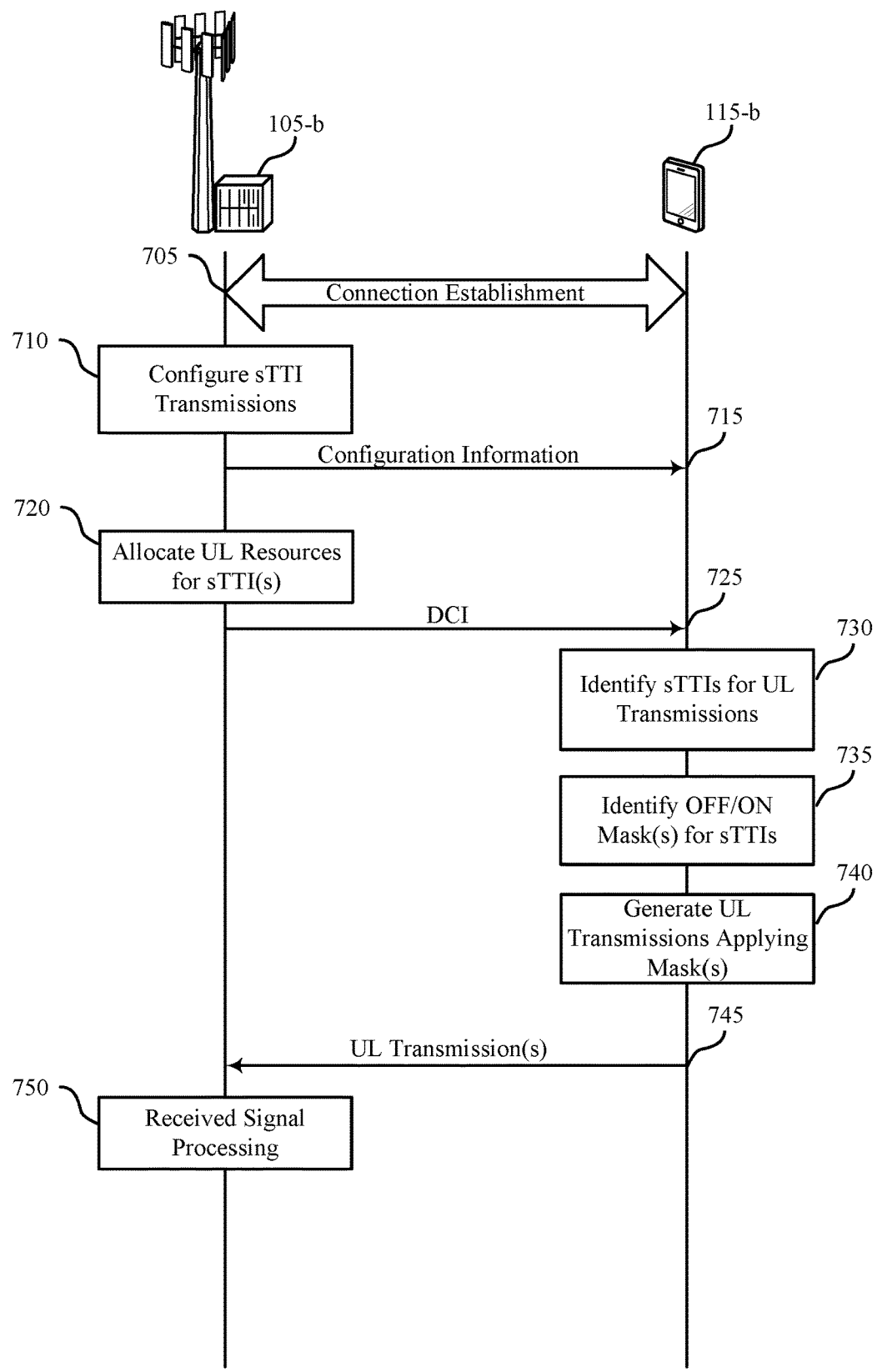
FIG. 7 illustrates an example of a process flow that supports time mask techniques for shortened transmission time intervals in accordance with aspects of the present disclosure.

FIG. 7 illustrates an example of a process flow 700 for time mask techniques. Process flow 700 may include a base station 105-b, and a UE 115-b, which may be examples of the corresponding devices described with reference to FIGS. 1 and 2. The base station 105-b and the UE 115-b may establish a connection 705 according to established connection establishment techniques for the wireless communications system.

At 710, base station 105-b may configure one or more services that may include services that use sTTI transmissions (e.g., URLLC services). Such a configuration may be made, for example, based on a wireless service that the UE 115-b is capable of supporting and that is to be served to the UE 115-b through the base station 105-b. For example, UE 115-b may request a URLLC service to be established, which may use sTTIs, such as slot sTTIs or 2-symbol sTTIs. The UE 115-b may also support other services (e.g., eMMB services) or legacy LTE services that may operate using a 1 ms TTI. In some cases, the base station 105-b may establish communications with the UE 115-b, and other UEs (not shown) based on the 1 ms TTI length and may establish slot-aligned sTTIs for low latency communications based on subframe time boundaries of the 1 ms TTIs. For example, base station 105-b may establish an sTTI configuration such that sTTIs do not span the subframe time boundaries or slot boundaries of the 1 ms TTI services.

In some examples, the configuration may include information on the cell-specific sTTIs and UE-specific sTTIs. In some cases, the configuration information may include sTTI patterns and symbol patterns within sTTIs, along with symbols and uplink resources that are to be used for sTTI transmissions. In some cases, the base station 105-b may transmit the configuration information to the UE 115-b, at 715.

At 720, the base station 105-b may allocate uplink resources for one or more sTTIs, for uplink transmissions from the UE 115-b. The base station 105-b may allocate sTTI resources based on, for example, buffer information for low latency services for the UE 115-b. The allocated resources may include, for example, two or more sTTIs. An indication of the allocated resources may be provided via downlink control information (DCI) transmitted to the UE 115-b, at 725.

At 730, the UE 115-b may identify sTTIs for uplink transmissions. The uplink sTTIs may be identified based on an uplink grant from the base station 105-b, for example. Additionally, an sTTI pattern for uplink transmissions may be identified in cases where 2-symbol and 3-symbol sTTIs are allocated to the UE 115-b.

At 735, the UE 115-b may identify OFF-ON and ON-OFF masks for sTTI transmissions. The masks may be identified, for example, based on the configuration information transmitted at 715, the DCI transmitted at 725, or a combination thereof. The UE 115-b may also identify one or more boundary time masks that may span a boundary between two sTTI transmissions.

At 740, the UE 115-b may generate uplink transmissions by applying the transient period masks. The uplink transmissions may include low latency data that is to be transmitted to the base station 105-b. At 745, the UE 115-b may transmit uplink transmission(s) to the base station 105-b using the allocated sTTIs.

At 750, the base station 105-b may perform received signal processing for the uplink transmissions. The received signal processing may include, for example, processing of the SRS transmissions to determine uplink channel quality over a frequency band associated with the SRS transmission, uplink timing information based on the SRS transmissions, or the like. Received signal processing may also include demodulation and decoding of uplink data and the generation of feedback (e.g., HARQ ACK/NACK feedback) to indicate successful or unsuccessful reception of the uplink data.

Figure 8:
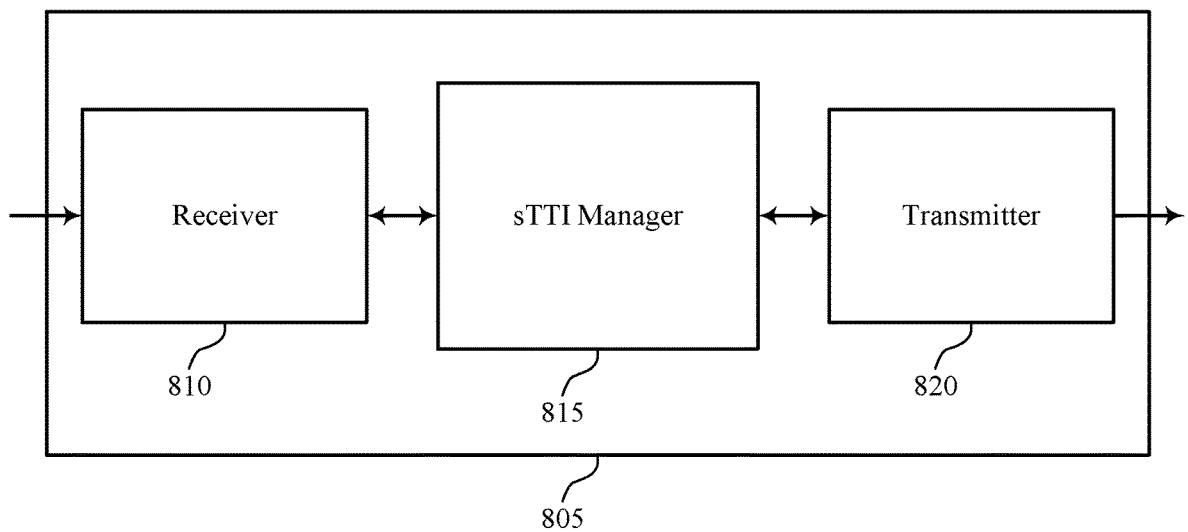
FIGS. 8 through 10 show block diagrams of a device that supports time mask techniques for shortened transmission time intervals in accordance with aspects of the present disclosure.

FIG. 8 shows a block diagram 800 of a wireless device 805 that supports time mask techniques in accordance with various aspects of the present disclosure. Wireless device 805 may be an example of aspects of a UE 115 as described with reference to FIG. 1. Wireless device 805 may include receiver 810, sTTI manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to time mask techniques, etc.). Information may be passed on to other components of the device. The receiver 810 may be an example of aspects of the transceiver 1135 described with reference to FIG. 11.

The sTTI manager 815 may be an example of aspects of the sTTI manager 1115 described with reference to FIG. 11.

The sTTI manager 815 and/or at least some of its various sub-components may be implemented in hardware, software executed by a processor, firmware, or any combination thereof. If implemented in software executed by a processor, the functions of the sTTI manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The sTTI manager 815 and/or at least some of its various sub-components may be physically located at various positions, including being distributed such that portions of functions are implemented at different physical locations by one or more physical devices. In some examples, sTTI manager 815 and/or at least some of its various sub-components may be a separate and distinct component in accordance with various aspects of the present disclosure. In other examples, sTTI manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The sTTI manager 815 may identify a first transient period between a transmit OFF power and transmit ON power for a wireless transmitter, the first transient period identified for a first TTI for an uplink transmission of the wireless transmitter, the first TTI having a first duration that is shorter than a threshold duration, identify a second transient period between the transmit ON power and transmit OFF power for the wireless transmitter, apply the first transient period as an OFF-ON mask that starts before a start of the first TTI, apply the second transient period as an ON-OFF mask that ends after an end of the first TTI, and transmit the uplink transmission during the TTI. In some cases, the threshold duration corresponds to a second duration of a second TTI for a second uplink transmission of the wireless transmitter.

Transmitter 820 may transmit signals generated by other components of the device. In some examples, the transmitter 820 may be collocated with a receiver 810 in a transceiver. For example, the transmitter 820 may be an example of aspects of the transceiver 1135 described with reference to FIG. 11. The transmitter 820 may include a single antenna, or it may include a set of antennas.

Figure 9:
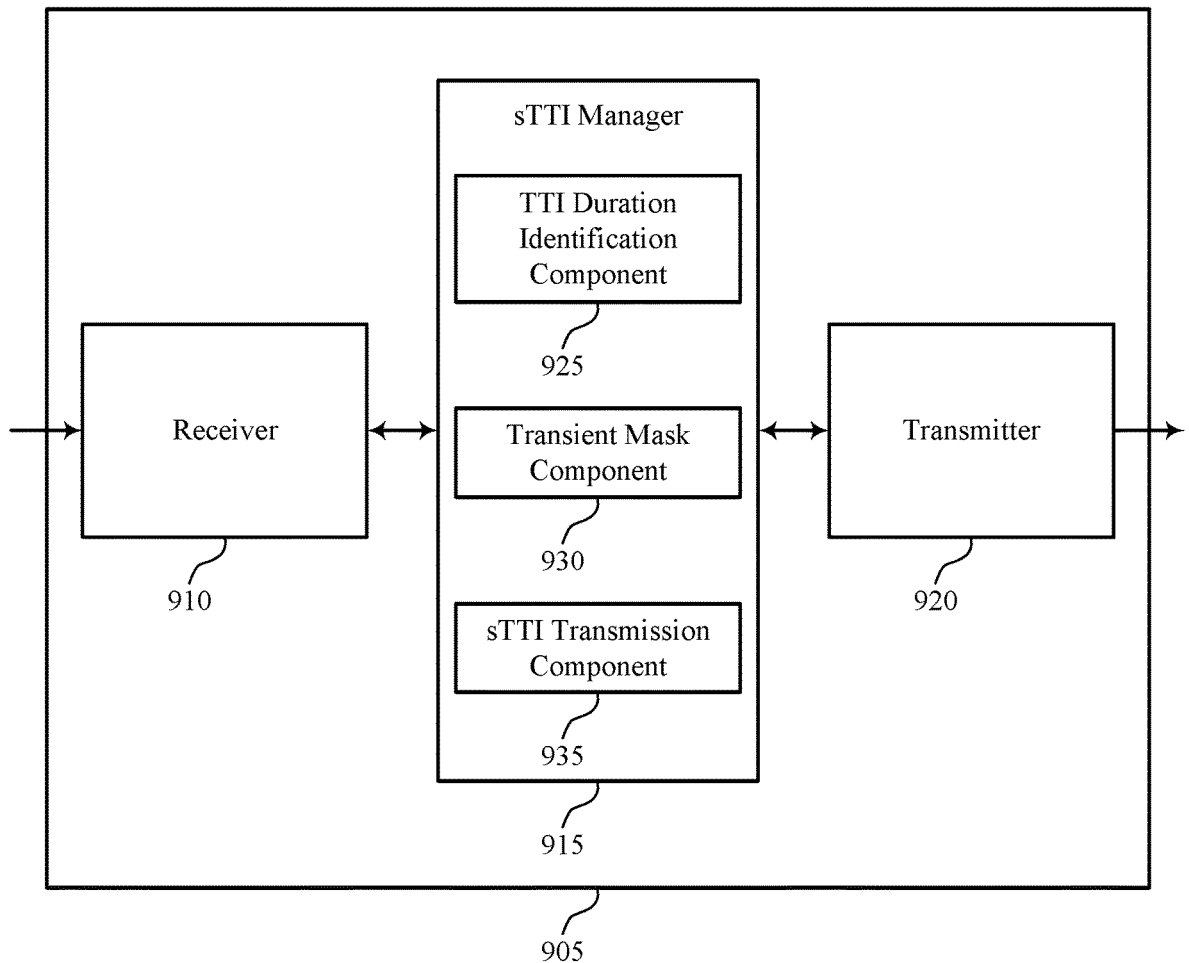

FIG. 9 shows a block diagram 900 of a wireless device 905 that supports time mask techniques in accordance with various aspects of the present disclosure. Wireless device 905 may be an example of aspects of a wireless device 805 or a UE 115 as described with reference to FIGS. 1 and 8. Wireless device 905 may include receiver 910, sTTI manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to time mask techniques, etc.). Information may be passed on to other components of the device. The receiver 910 may be an example of aspects of the transceiver 1135 described with reference to FIG. 11.

The sTTI manager 915 may be an example of aspects of the sTTI manager 1115 described with reference to FIG. 11. The sTTI manager 915 may also include TTI duration identification component 925, transient mask component 930, and sTTI transmission component 935.

TTI duration identification component 925 may identify a first transient period between a transmit OFF power and transmit ON power for a wireless transmitter, the first transient period identified for a first TTI for an uplink transmission of the wireless transmitter, the first TTI having a first duration that is shorter than a threshold duration, and identify a second transient period between the transmit ON power and transmit OFF power for the wireless transmitter. In some cases, TTI duration identification component 925 may identify a third transient period between a first transmit ON power associated with the first TTI and a second transmit ON power associated with the second TTI.

Transient mask component 930 may apply the first transient period as an OFF-ON mask that starts before a start of the first TTI, apply the second transient period as an ON-OFF mask that ends after an end of the first TTI. In some cases, transient mask component 930 may apply the third transient period as a boundary time mask that spans a boundary between the first TTI and the second TTI, and apply the ON-OFF mask to an end of the second TTI. In some cases, transient mask component 930 may apply the OFF-ON mask to start concurrently with a start of a second set of TTIs, each TTI of the second set of TTIs having a second TTI duration, the second TTI duration being greater than the first duration, and apply the ON-OFF mask to start concurrently with an end of the second set of TTIs. In some cases, one or more of the first transient period or the second transient period may have a longer duration for narrowband transmission bandwidths than for wideband transmission bandwidths. In some cases, the applying the first transient period as the OFF-ON mask further includes applying the OFF-ON mask to end concurrently with a start of the first TTI. In some cases, the applying the second transient period as the ON-OFF mask further includes applying the ON-OFF mask to start concurrently with an end of the first TTI. In some cases, the boundary time mask is centered at the boundary between the first TTI and the second TTI. In some cases, a duration of the boundary time mask is shorter than one or more of the first transient period or the second transient period.

The sTTI transmission component 935 may transmit the uplink transmission during the TTI and transmit the second uplink transmission during the second TTI.

Transmitter 920 may transmit signals generated by other components of the device. In some examples, the transmitter 920 may be collocated with a receiver 910 in a transceiver. For example, the transmitter 920 may be an example of aspects of the transceiver 1135 described with reference to FIG. 11. The transmitter 920 may include a single antenna, or it may include a set of antennas.

Figure 10:
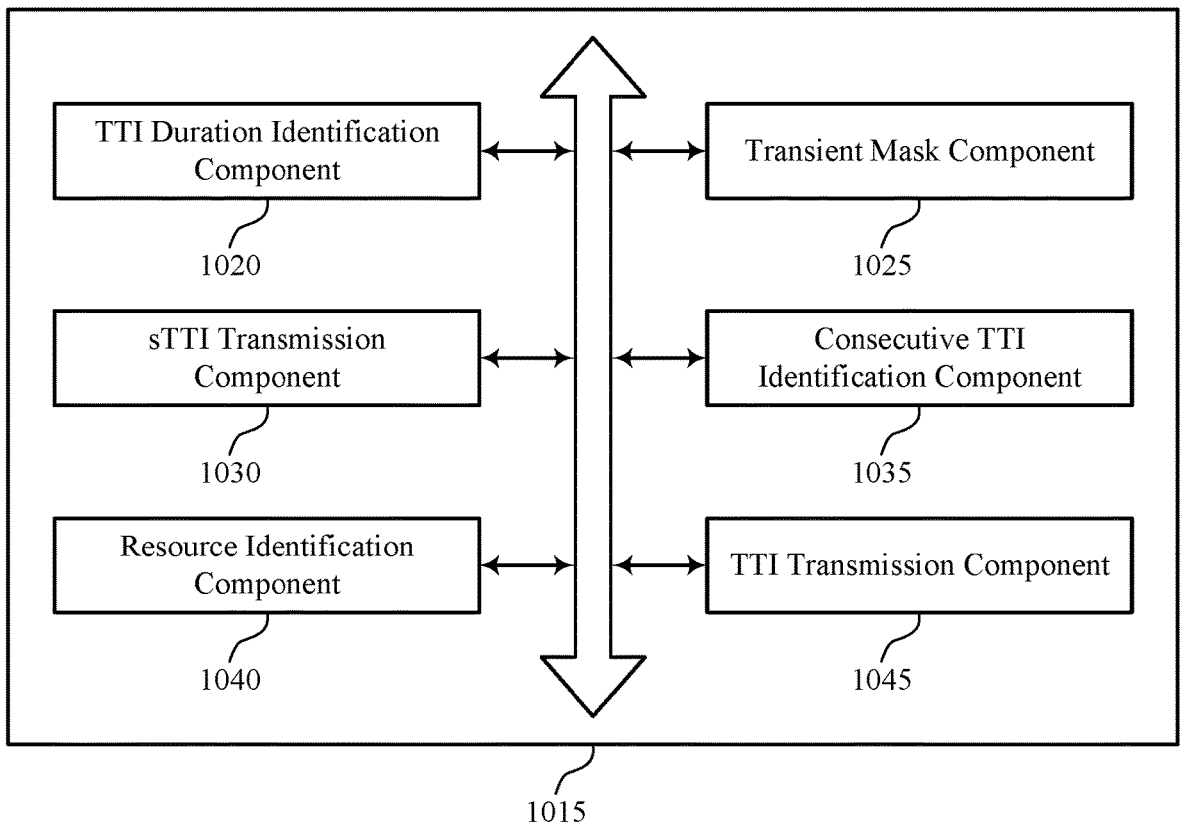

FIG. 10 shows a block diagram 1000 of a sTTI manager 1015 that supports time mask techniques in accordance with various aspects of the present disclosure. The sTTI manager 1015 may be an example of aspects of a sTTI manager 815, a sTTI manager 915, or a sTTI manager 1115 described with reference to FIGS. 8, 9, and 11. The sTTI manager 1015 may include TTI duration identification component 1020, transient mask component 1025, sTTI transmission component 1030, consecutive TTI identification component 1035, resource identification component 1040, and TTI transmission component 1045. Each of these subcomponents may communicate, directly or indirectly, with one another (e.g., via one or more buses).

TTI duration identification component 1020 may identify a first transient period between a transmit OFF power and transmit ON power for a wireless transmitter, the first transient period identified for a first TTI for an uplink transmission of the wireless transmitter, the first TTI having a first duration that is shorter than a threshold duration, identify a second transient period between the transmit ON power and transmit OFF power for the wireless transmitter, and identify a third transient period between a first transmit ON power associated with the first TTI and a second transmit ON power associated with the second TTI.

Transient mask component 1025 may apply the first transient period as an OFF-ON mask that starts before a start of the first TTI, and apply the second transient period as an ON-OFF mask that ends after an end of the first TTI. In some cases, transient mask component 1025 may apply the third transient period as a boundary time mask that spans a boundary between the first TTI and the second TTI, and apply the ON-OFF mask to an end of the second TTI. In some cases, transient mask component 1025 may apply the OFF-ON mask to start concurrently with a start of a second set of TTIs, each TTI of the second set of TTIs having a second TTI duration, the second TTI duration being greater than the first duration, and apply the ON-OFF mask to start concurrently with an end of the second set of TTIs. In some cases, one or more of the first transient period or the second transient period has a longer duration for narrowband transmission bandwidths than for wideband transmission bandwidths. In some cases, the applying the first transient period as the OFF-ON mask further includes applying the OFF-ON mask to end concurrently with a start of the first TTI. In some cases, the applying the second transient period as the ON-OFF mask further includes applying the ON-OFF mask to start concurrently with an end of the first TTI. In some cases, the boundary time mask is centered at the boundary between the first TTI and the second TTI. In some cases, a duration of the boundary time mask is shorter than one or more of the first transient period or the second transient period.

STTI transmission component 1030 may transmit the uplink transmission during the TTI and transmit the second uplink transmission during the second TTI.

Consecutive TTI identification component 1035 may identify a second uplink transmission to be transmitted in a second TTI, the second TTI consecutive to the first TTI and having the first duration.

Resource identification component 1040 may determine that one or more of a transmission power or a frequency allocation of the second TTI is different than the transmission power or the frequency allocation of the first TTI, and where the boundary time mask is applied based on the determining. In some cases, resource identification component 1040 may identify a transmission bandwidth for the uplink transmission, and where one or more of the first or second transient periods are identified based on the transmission bandwidth for the uplink transmission.

The TTI transmission component 1045 may transmit a second uplink transmission during the second set of TTIs.

Figure 11:
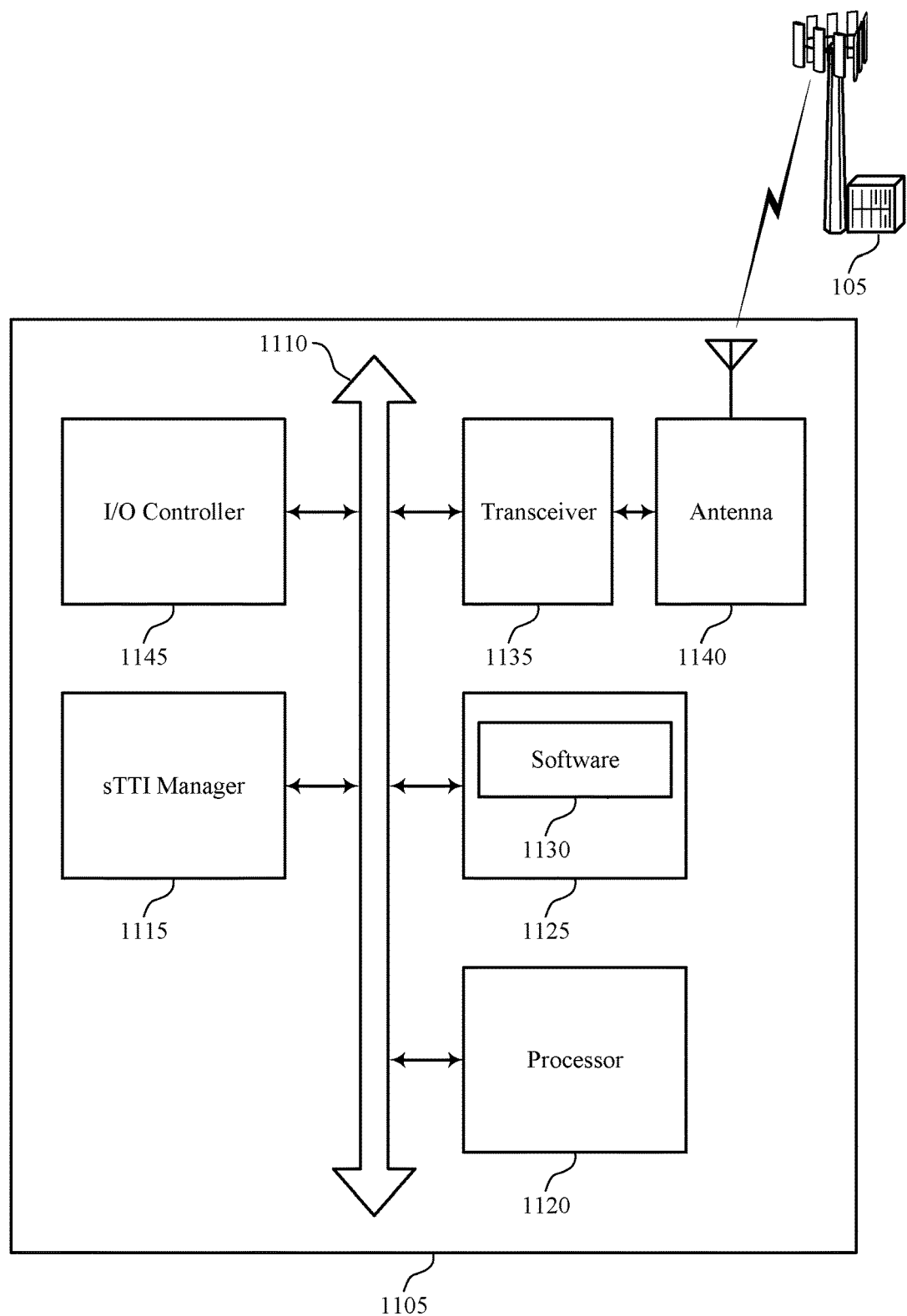
FIG. 11 illustrates a block diagram of a system including a UE that supports time mask techniques for shortened transmission time intervals in accordance with aspects of the present disclosure.

FIG. 11 shows a diagram of a system 1100 including a device 1105 that supports time mask techniques in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including sTTI manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting time mask techniques).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support time mask techniques. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
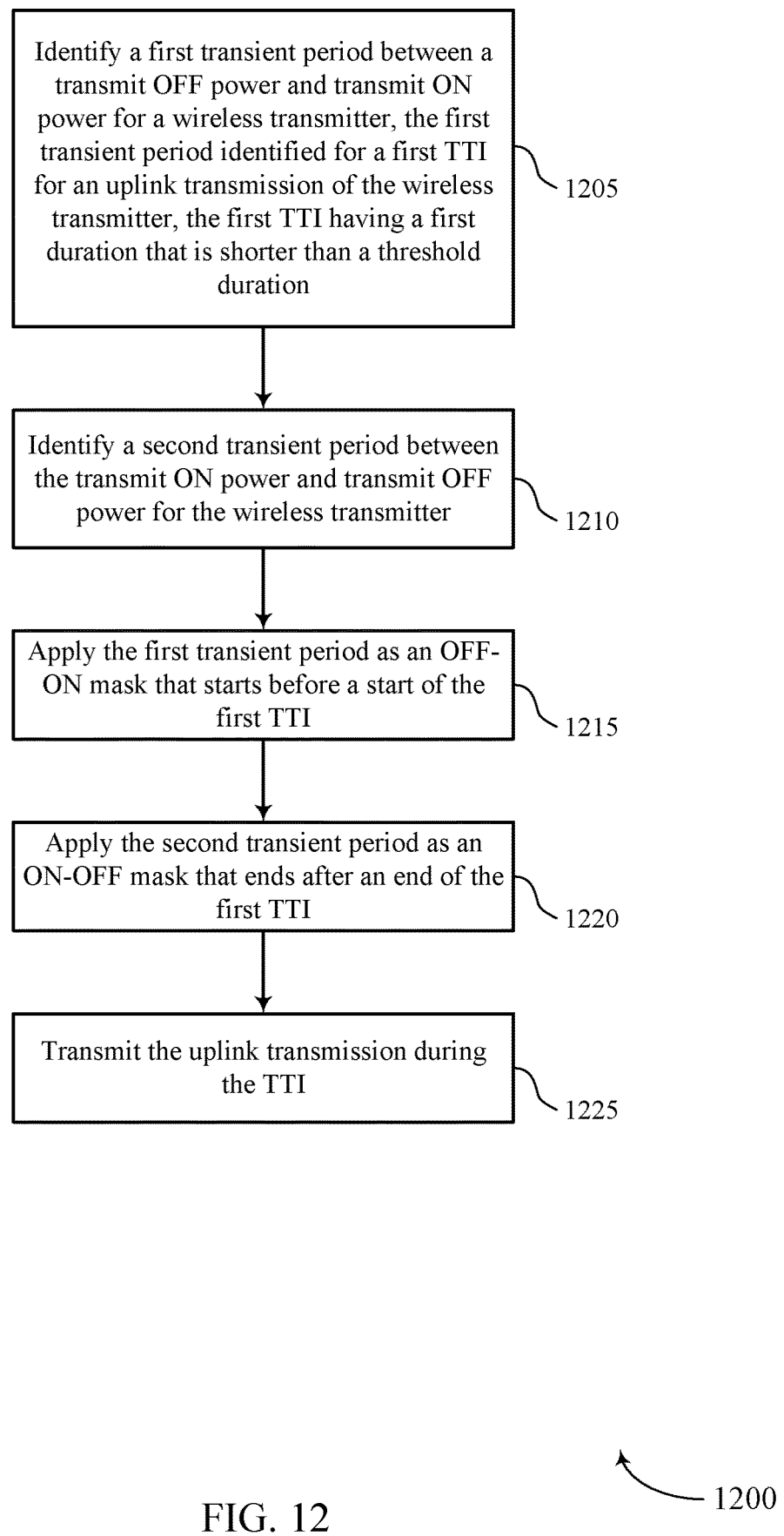
FIGS. 12 through 15 illustrate methods for time mask techniques for shortened transmission time intervals in accordance with aspects of the present disclosure.

FIG. 12 shows a flowchart illustrating a method 1200 for time mask techniques in accordance with various aspects of the present disclosure. The operations of method 1200 may be implemented by a UE 115 or its components as described herein. For example, the operations of method 1200 may be performed by a sTTI manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1205, the UE 115 may identify a first transient period between a transmit OFF power and transmit ON power for a wireless transmitter, the first transient period identified for a first TTI for an uplink transmission of the wireless transmitter, the first TTI having a first duration that is shorter than a threshold duration. The operations at 1205 may be performed according to the methods described with reference to FIGS. 1 through 7. In certain examples, aspects of the operations at 1205 may be performed by a TTI duration identification component as described with reference to FIGS. 8 through 11.

At 1210, the UE 115 may identify a second transient period between the transmit ON power and transmit OFF power for the wireless transmitter. The operations at 1210 may be performed according to the methods described with reference to FIGS. 1 through 7. In certain examples, aspects of the operations at 1210 may be performed by a TTI duration identification component as described with reference to FIGS. 8 through 11.

At 1215, the UE 115 may apply the first transient period as an OFF-ON mask that starts before a start of the first TTI. The operations at 1215 may be performed according to the methods described with reference to FIGS. 1 through 7. In certain examples, aspects of the operations at 1215 may be performed by a transient mask component as described with reference to FIGS. 8 through 11.

At 1220, the UE 115 may apply the second transient period as an ON-OFF mask that ends after an end of the first TTI. The operations at 1220 may be performed according to the methods described with reference to FIGS. 1 through 7. In certain examples, aspects of the operations at 1220 may be performed by a transient mask component as described with reference to FIGS. 8 through 11.

At 1225, the UE 115 may transmit the uplink transmission during the TTI. The operations at 1225 may be performed according to the methods described with reference to FIGS. 1 through 7. In certain examples, aspects of the operations at 1225 may be performed by an sTTI transmission component as described with reference to FIGS. 8 through 11.

Figure 13:
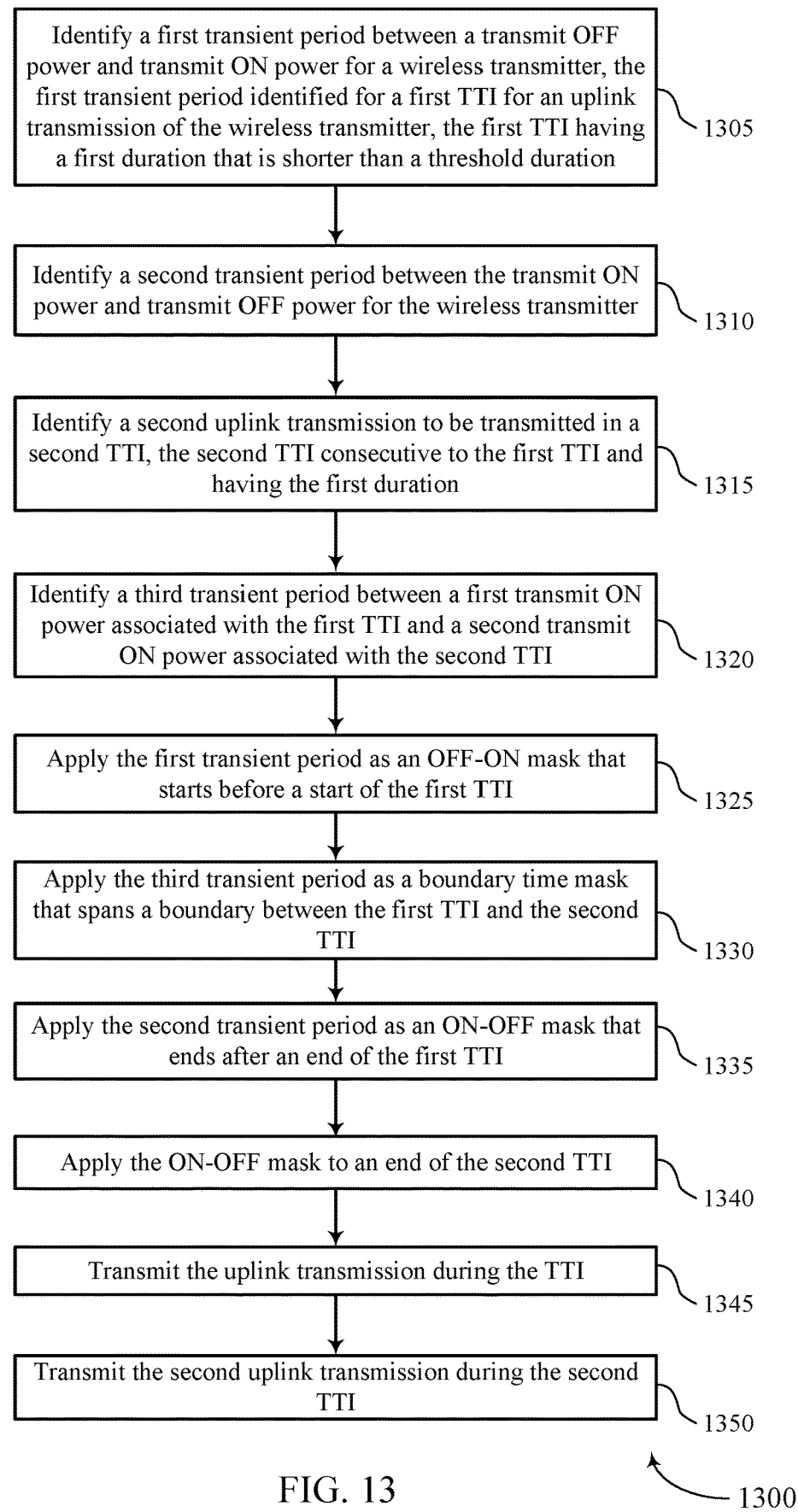

FIG. 13 shows a flowchart illustrating a method 1300 for time mask techniques in accordance with various aspects of the present disclosure. The operations of method 1300 may be implemented by a UE 115 or its components as described herein. For example, the operations of method 1300 may be performed by a sTTI manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may identify a first transient period between a transmit OFF power and transmit ON power for a wireless transmitter, the first transient period identified for a first TTI for an uplink transmission of the wireless transmitter, the first TTI having a first duration that is shorter than a threshold duration. The operations at 1305 may be performed according to the methods described with reference to FIGS. 1 through 7. In certain examples, aspects of the operations at 1305 may be performed by a TTI duration identification component as described with reference to FIGS. 8 through 11.

At 1310, the UE 115 may identify a second transient period between the transmit ON power and transmit OFF power for the wireless transmitter. The operations at 1310 may be performed according to the methods described with reference to FIGS. 1 through 7. In certain examples, aspects of the operations at 1310 may be performed by a TTI duration identification component as described with reference to FIGS. 8 through 11.

At 1315, the UE 115 may identify a second uplink transmission to be transmitted in a second TTI, the second TTI consecutive to the first TTI and having the first duration. The operations at 1315 may be performed according to the methods described with reference to FIGS. 1 through 7. In certain examples, aspects of the operations at 1315 may be performed by a consecutive TTI identification component as described with reference to FIGS. 8 through 11.

At 1320, the UE 115 may identify a third transient period between a first transmit ON power associated with the first TTI and a second transmit ON power associated with the second TTI. The operations at 1320 may be performed according to the methods described with reference to FIGS. 1 through 7. In certain examples, aspects of the operations at 1320 may be performed by a TTI duration identification component as described with reference to FIGS. 8 through 11.

At 1325, the UE 115 may apply the first transient period as an OFF-ON mask that starts before a start of the first TTI. The operations at 1325 may be performed according to the methods described with reference to FIGS. 1 through 7. In certain examples, aspects of the operations at 1325 may be performed by a transient mask component as described with reference to FIGS. 8 through 11.

At 1330, the UE 115 may apply the third transient period as a boundary time mask that spans a boundary between the first TTI and the second TTI. The operations at 1330 may be performed according to the methods described with reference to FIGS. 1 through 7. In certain examples, aspects of the operations at 1330 may be performed by a transient mask component as described with reference to FIGS. 8 through 11.

At 1335, the UE 115 may apply the second transient period as an ON-OFF mask that ends after an end of the first TTI. The operations at 1335 may be performed according to the methods described with reference to FIGS. 1 through 7. In certain examples, aspects of the operations at 1335 may be performed by a transient mask component as described with reference to FIGS. 8 through 11.

At 1340, the UE 115 may apply the ON-OFF mask to an end of the second TTI. The operations at 1340 may be performed according to the methods described with reference to FIGS. 1 through 7. In certain examples, aspects of the operations at 1340 may be performed by a transient mask component as described with reference to FIGS. 8 through 11.

At 1345, the UE 115 may transmit the uplink transmission during the TTI. The operations at 1345 may be performed according to the methods described with reference to FIGS. 1 through 7. In certain examples, aspects of the operations at 1345 may be performed by an sTTI transmission component as described with reference to FIGS. 8 through 11.

At 1350, the UE 115 may transmit the second uplink transmission during the second TTI. The operations at 1350 may be performed according to the methods described with reference to FIGS. 1 through 7. In certain examples, aspects of the operations at 1350 may be performed by an sTTI transmission component as described with reference to FIGS. 8 through 11.

Figure 14:
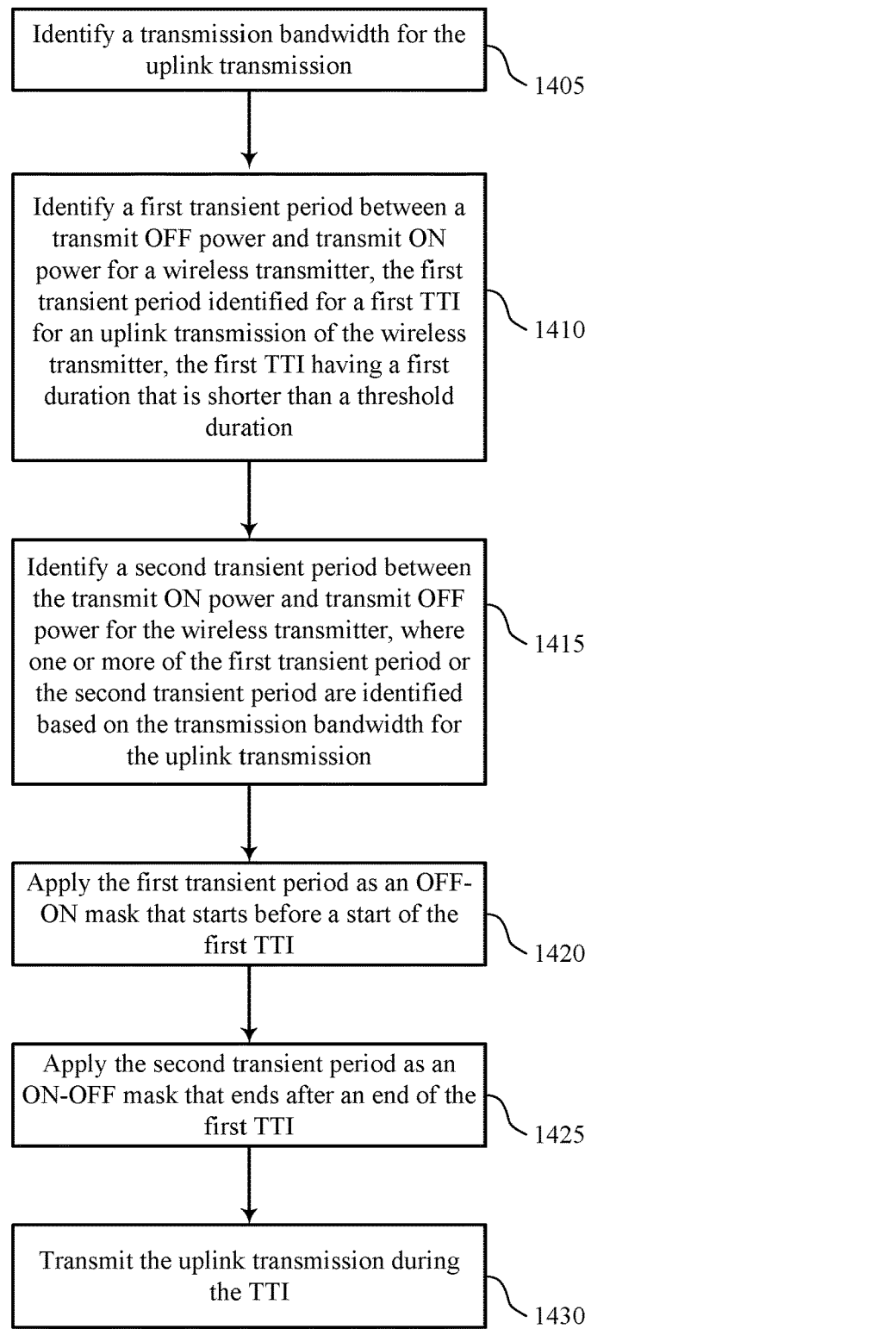

FIG. 14 shows a flowchart illustrating a method 1400 for time mask techniques in accordance with various aspects of the present disclosure. The operations of method 1400 may be implemented by a UE 115 or its components as described herein. For example, the operations of method 1400 may be performed by an sTTI manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may identify a transmission bandwidth for the uplink transmission. The operations at 1405 may be performed according to the methods described with reference to FIGS. 1 through 7. In certain examples, aspects of the operations at 1405 may be performed by a resource identification component as described with reference to FIGS. 8 through 11.

At 1410, the UE 115 may identify a first transient period between a transmit OFF power and transmit ON power for a wireless transmitter, the first transient period identified for a first TTI for an uplink transmission of the wireless transmitter, the first TTI having a first duration that is shorter than a threshold duration. The operations at 1410 may be performed according to the methods described with reference to FIGS. 1 through 7. In certain examples, aspects of the operations at 1410 may be performed by a TTI duration identification component as described with reference to FIGS. 8 through 11.

At 1415, the UE 115 may identify a second transient period between the transmit ON power and transmit OFF power for the wireless transmitter, where one or more of the first transient period or the second transient period are identified based at least in part on the transmission bandwidth for the uplink transmission. The operations at 1415 may be performed according to the methods described with reference to FIGS. 1 through 7. In certain examples, aspects of the operations at 1415 may be performed by a TTI duration identification component as described with reference to FIGS. 8 through 11.

At 1420, the UE 115 may apply the first transient period as an OFF-ON mask that starts before a start of the first TTI. The operations at 1420 may be performed according to the methods described with reference to FIGS. 1 through 7. In certain examples, aspects of the operations of block 1420 may be performed by a transient mask component as described with reference to FIGS. 8 through 11.

At 1425, the UE 115 may apply the second transient period as an ON-OFF mask that ends after an end of the first TTI. The operations at 1425 may be performed according to the methods described with reference to FIGS. 1 through 7. In certain examples, aspects of the operations at 1425 may be performed by a transient mask component as described with reference to FIGS. 8 through 11.

At 1430, the UE 115 may transmit the uplink transmission during the TTI. The operations at 1430 may be performed according to the methods described with reference to FIGS. 1 through 7. In certain examples, aspects of the operations at 1430 may be performed by an sTTI transmission component as described with reference to FIGS. 8 through 11.

Figure 15:
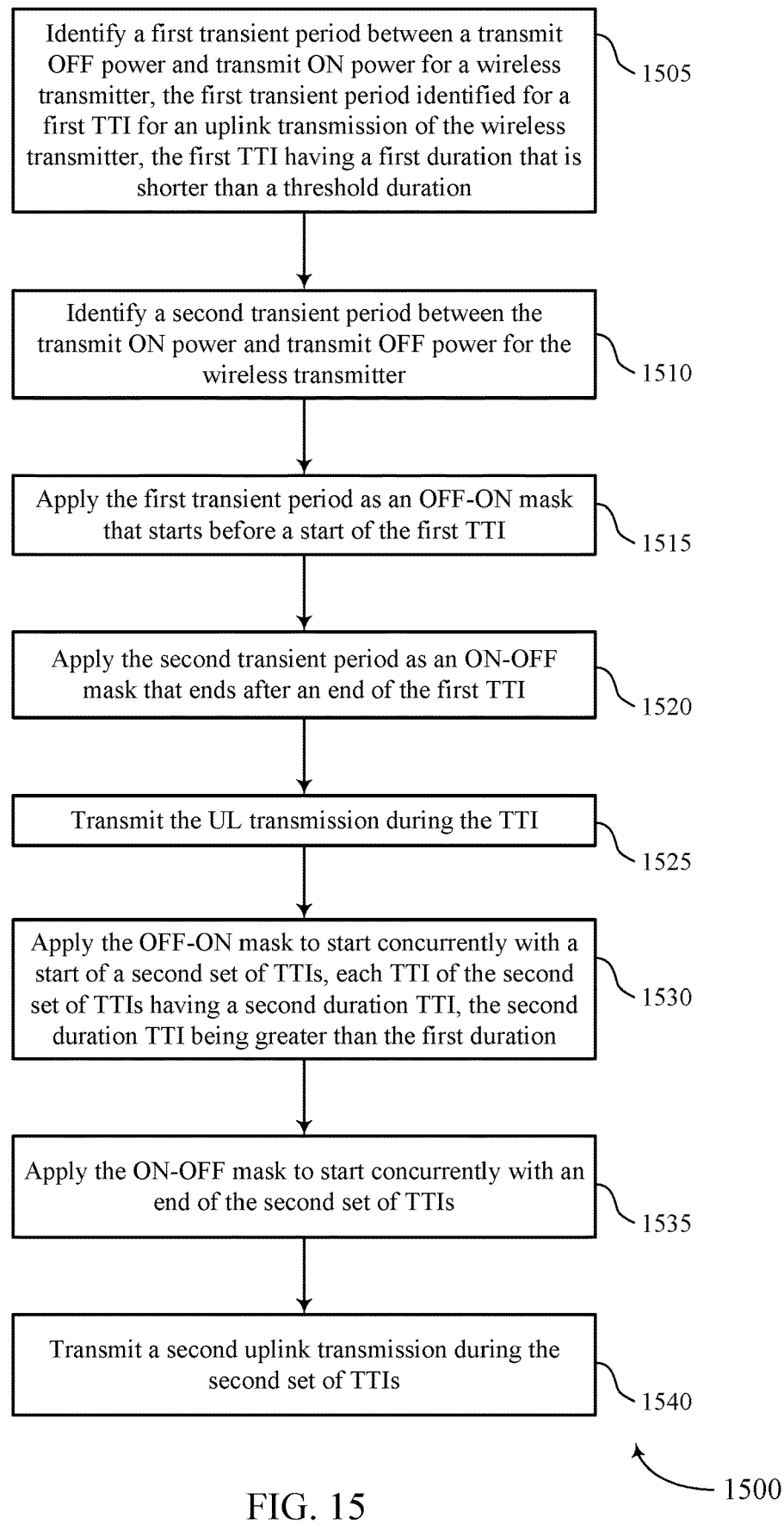

FIG. 15 shows a flowchart illustrating a method 1500 for time mask techniques in accordance with various aspects of the present disclosure. The operations of method 1500 may be implemented by a UE 115 or its components as described herein. For example, the operations of method 1500 may be performed by a sTTI manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may identify a first transient period between a transmit OFF power and transmit ON power for a wireless transmitter, the first transient period identified for a first TTI for an uplink transmission of the wireless transmitter, the first TTI having a first duration that is shorter than a threshold duration. The operations at 1505 may be performed according to the methods described with reference to FIGS. 1 through 7. In certain examples, aspects of the operations at 1505 may be performed by a TTI duration identification component as described with reference to FIGS. 8 through 11.

At 1510, the UE 115 may identify a second transient period between the transmit ON power and transmit OFF power for the wireless transmitter. The operations at 1510 may be performed according to the methods described with reference to FIGS. 1 through 7. In certain examples, aspects of the operations at 1510 may be performed by a TTI duration identification component as described with reference to FIGS. 8 through 11.

At 1515, the UE 115 may apply the first transient period as an OFF-ON mask that starts before a start of the first TTI. The operations at 1515 may be performed according to the methods described with reference to FIGS. 1 through 7. In certain examples, aspects of the operations at 1515 may be performed by a transient mask component as described with reference to FIGS. 8 through 11.

At 1520, the UE 115 may apply the second transient period as an ON-OFF mask that ends after an end of the first TTI. The operations at 1520 may be performed according to the methods described with reference to FIGS. 1 through 7. In certain examples, aspects of the operations at 1520 may be performed by a transient mask component as described with reference to FIGS. 8 through 11.

At 1525, the UE 115 may transmit the uplink transmission during the TTI. The operations at 1525 may be performed according to the methods described with reference to FIGS. 1 through 7. In certain examples, aspects of the operations at 1525 may be performed by an sTTI transmission component as described with reference to FIGS. 8 through 11.

At 1530, the UE 115 may apply the OFF-ON mask to start concurrently with a start of a second set of TTIs, each TTI of the second set of TTIs having a second TTI duration, the second TTI duration being greater than the first duration. The operations at 1530 may be performed according to the methods described with reference to FIGS. 1 through 7. In certain examples, aspects of the operations at 1530 may be performed by a transient mask component as described with reference to FIGS. 8 through 11.

At 1535, the UE 115 may apply the ON-OFF mask to start concurrently with an end of the second set of TTIs. The operations at 1535 may be performed according to the methods described with reference to FIGS. 1 through 7. In certain examples, aspects of the operations at 1535 may be performed by a transient mask component as described with reference to FIGS. 8 through 11.

At 1540, the UE 115 may transmit a second uplink transmission during the second set of TTIs. The operations at 1540 may be performed according to the methods described with reference to FIGS. 1 through 7. In certain examples, aspects of the operations at 1540 may be performed by a TTI transmission component as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

In some examples of the method, apparatus, and non-transitory computer-readable medium described above, the threshold duration corresponds to a second duration of a second TTI for a second uplink transmission of the wireless transmitter.

Some examples of the method, apparatus, and non-transitory computer-readable medium described above may further include processes, features, means, or instructions for identifying a second uplink transmission to be transmitted in a second TTI, the second TTI consecutive to the first TTI and having the first duration. Some examples of the method, apparatus, and non-transitory computer-readable medium described above may further include processes, features, means, or instructions for identifying a third transient period between a first transmit ON power associated with the first TTI and a second transmit ON power associated with the second TTI. Some examples of the method, apparatus, and non-transitory computer-readable medium described above may further include processes, features, means, or instructions for applying the third transient period as a boundary time mask that spans a boundary between the first TTI and the second TTI. Some examples of the method, apparatus, and non-transitory computer-readable medium described above may further include processes, features, means, or instructions for transmitting the second uplink transmission during the second TTI.

Some examples of the method, apparatus, and non-transitory computer-readable medium described above may further include processes, features, means, or instructions for applying the ON-OFF mask to an end of the second TTI.

In some examples of the method, apparatus, and non-transitory computer-readable medium described above, the boundary time mask may be centered at the boundary between the first TTI and the second TTI. In some examples of the method, apparatus, and non-transitory computer-readable medium described above, a duration of the boundary time mask may be shorter than one or more of the first transient period or the second transient period. Some examples of the method, apparatus, and non-transitory computer-readable medium described above may further include processes, features, means, or instructions for determining that one or more of a transmission power or a frequency allocation of the second TTI may be different than the transmission power or the frequency allocation of the first TTI, and wherein the boundary time mask may be applied based on the determining.

Some examples of the method, apparatus, and non-transitory computer-readable medium described above may further include processes, features, means, or instructions for identifying a transmission bandwidth for the uplink transmission, and wherein one or more of the first transient period or the second transient period may be identified based at least in part on the transmission bandwidth for the uplink transmission. In some examples of the method, apparatus, and non-transitory computer-readable medium described above, one or more of the first transient period or the second transient period may have a longer duration for narrowband transmission bandwidths than for wideband transmission bandwidths.

In some examples of the method, apparatus, and non-transitory computer-readable medium described above, the applying the first transient period as the OFF-ON mask further comprises applying the OFF-ON mask to end concurrently with a start of the first TTI. In some examples of the method, apparatus, and non-transitory computer-readable medium described above, the applying the second transient period as the ON-OFF mask further comprises applying the ON-OFF mask to start concurrently with an end of the first TTI.

Some examples of the method, apparatus, and non-transitory computer-readable medium described above may further include processes, features, means, or instructions for applying the OFF-ON mask to start concurrently with a start of a second set of TTIs, each TTI of the second set of TTIs having a second TTI duration, the second TTI duration being greater than the first duration. Some examples of the method, apparatus, and non-transitory computer-readable medium described above may further include processes, features, means, or instructions for applying the ON-OFF mask to start concurrently with an end of the second set of TTIs. Some examples of the method, apparatus, and non-transitory computer-readable medium described above may further include processes, features, means, or instructions for transmitting a second uplink transmission during the second set of TTIs.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and subcomponents described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a first transient period between a transmit OFF power and transmit ON power for a wireless transmitter, the first transient period identified for a first transmission time interval (TTI) for an uplink transmission of the wireless transmitter, the first TTI having a first duration that is shorter than a threshold duration;
identifying a second transient period between the transmit ON power and transmit OFF power for the wireless transmitter, wherein a duration of the first transient period, the second transient period, or both is a function of frequency bandwidth of the uplink transmission, and wherein one or both of the first transient period or the second transient period has a longer duration for a first frequency bandwidth for the uplink transmission than for a second frequency bandwidth for the uplink transmission based at least in part on a transmission bandwidth of the uplink transmission satisfying a transmission bandwidth threshold and based at least in part on the function of frequency bandwidth;
applying the first transient period as an OFF-ON mask that starts before a start of the first TTI;
applying the second transient period as an ON-OFF mask that ends after an end of the first TTI; and
transmitting the uplink transmission during the first TTI.

2. The method of claim 1, wherein the threshold duration corresponds to a second duration of a second TTI for a second uplink transmission of the wireless transmitter.

3. The method of claim 1, further comprising:
identifying a second uplink transmission to be transmitted in a second TTI, the second TTI consecutive to the first TTI and having the first duration;
identifying a third transient period between a first transmit ON power associated with the first TTI and a second transmit ON power associated with the second TTI;
applying the third transient period as a boundary time mask that spans a boundary between the first TTI and the second TTI; and
transmitting the second uplink transmission during the second TTI.

4. The method of claim 3, further comprising:
applying the ON-OFF mask to an end of the second TTI.

5. The method of claim 3, wherein the boundary time mask is centered at the boundary between the first TTI and the second TTI.

6. The method of claim 3, wherein a duration of the boundary time mask is shorter than one or more of the first transient period or the second transient period.

7. The method of claim 3, further comprising:
determining that one or more of a transmission power or a frequency allocation of the second TTI is different than the transmission power or the frequency allocation of the first TTI, and wherein the boundary time mask is applied based on the determining.

8. The method of claim 1, further comprising:
identifying a transmission bandwidth for the uplink transmission, wherein one or more of the first transient period or the second transient period are identified based at least in part on the transmission bandwidth for the uplink transmission.

9. The method of claim 1, wherein the first TTI comprises a shortened TTI (sTTI) and the threshold duration comprises 1 ms.

10. The method of claim 1, wherein the applying the first transient period as the OFF-ON mask further comprises applying the OFF-ON mask to end concurrently with a start of the first TTI.

11. The method of claim 1, wherein the applying the second transient period as the ON-OFF mask further comprises applying the ON-OFF mask to start concurrently with an end of the first TTI.

12. The method of claim 1, further comprising:
applying the OFF-ON mask to start concurrently with a start of a second set of TTIs, each TTI of the second set of TTIs having a second TTI duration, the second TTI duration being greater than the first duration;
applying the ON-OFF mask to start concurrently with an end of the second set of TTIs; and
transmitting a second uplink transmission during the second set of TTIs.

13. An apparatus for wireless communication, comprising:
means for identifying a first transient period between a transmit OFF power and transmit ON power for a wireless transmitter, the first transient period identified for a first transmission time interval (TTI) for an uplink transmission of the wireless transmitter, the first TTI having a first duration that is shorter than a threshold duration;

means for identifying a second transient period between the transmit ON power and transmit OFF power for the wireless transmitter, wherein a duration of the first transient period, the second transient period, or both is a function of frequency bandwidth of the uplink transmission, and wherein one or both of the first transient period or the second transient period has a longer duration for a first frequency bandwidth for the uplink transmission than for a second frequency bandwidth for the uplink transmission based at least in part on a transmission bandwidth of the uplink transmission satisfying a transmission bandwidth threshold and based at least in part on the function of frequency bandwidth;

means for applying the first transient period as an OFF-ON mask that starts before a start of the first TTI;

means for applying the second transient period as an ON-OFF mask that ends after an end of the first TTI; and means for transmitting the uplink transmission during the first TTI.

14. The apparatus of claim 13, wherein the threshold duration corresponds to a second duration of a second TTI for a second uplink transmission of the wireless transmitter.

15. The apparatus of claim 13, further comprising:
means for identifying a second uplink transmission to be transmitted in a second TTI, the second TTI consecutive to the first TTI and having the first duration;
means for identifying a third transient period between a first transmit ON power associated with the first TTI and a second transmit ON power associated with the second TTI;
means for applying the third transient period as a boundary time mask that spans a boundary between the first TTI and the second TTI; and
means for transmitting the second uplink transmission during the second TTI.

16. An apparatus for wireless communication, in a system comprising: a processor; memory in electronic communication with the processor; and
instructions stored in the memory and operable, when executed by the processor, to cause the apparatus to:
identify a first transient period between a transmit OFF power and transmit ON power for a wireless transmitter, the first transient period identified for a first transmission time interval (TTI) for an uplink transmission of the wireless transmitter, the first TTI having a first duration that is shorter than a threshold duration;
identify a second transient period between the transmit ON power and transmit OFF power for the wireless transmitter, wherein a duration of the first transient period, the second transient period, or both is a function of frequency bandwidth of the uplink transmission, and wherein one or both of the first transient period or the second transient period has a longer duration for a first frequency bandwidth for the uplink transmission than for a second frequency bandwidth for the uplink transmission based at least in part on a transmission bandwidth of the uplink transmission satisfying a transmission bandwidth threshold and based at least in part on the function of frequency bandwidth;
apply the first transient period as an OFF-ON mask that starts before a start of the first TTI;
apply the second transient period as an ON-OFF mask that ends after an end of the first TTI; and
transmit the uplink transmission during the first TTI.

17. The apparatus of claim 16, wherein the threshold duration corresponds to a second duration of a second TTI for a second uplink transmission of the wireless transmitter.

18. The apparatus of claim 16, wherein the instructions are further executable by the processor to:
identify a second uplink transmission to be transmitted in a second TTI, the second TTI consecutive to the first TTI and having the first duration;
identify a third transient period between a first transmit ON power associated with the first TTI and a second transmit ON power associated with the second TTI;
apply the third transient period as a boundary time mask that spans a boundary between the first TTI and the second TTI; and
transmit the second uplink transmission during the second TTI.

19. The apparatus of claim 18, wherein the instructions are further executable by the processor to:
apply the ON-OFF mask to an end of the second TTI.

20. The apparatus of claim 18, wherein the boundary time mask is centered at the boundary between the first TTI and the second TTI.

21. The apparatus of claim 18, wherein a duration of the boundary time mask is shorter than one or more of the first transient period or the second transient period.

22. The apparatus of claim 18, wherein the instructions are further executable by the processor to:
determine that one or more of a transmission power or a frequency allocation of the second TTI is different than the transmission power or the frequency allocation of the first TTI, and wherein the boundary time mask is applied based on the determining.

23. The apparatus of claim 16, wherein the instructions are further executable by the processor to:
identify a transmission bandwidth for the uplink transmission, wherein one or more of the first transient period or the second transient period are identified based at least in part on the transmission bandwidth for the uplink transmission.

24. The apparatus of claim 16, wherein the first TTI comprises a shortened TTI (sTTI) and the threshold duration comprises 1 ms.

25. The apparatus of claim 16, wherein the applying the first transient period as the OFF-ON mask further comprises applying the OFF-ON mask to end concurrently with a start of the first TTI.

26. The apparatus of claim 16, wherein the applying the second transient period as the ON-OFF mask further comprises applying the ON-OFF mask to start concurrently with an end of the first TTI.

27. The apparatus of claim 16, wherein the instructions are further executable by the processor to:
apply the OFF-ON mask to start concurrently with a start of a second set of TTIs, each TTI of the second set of TTIs having a second TTI duration, the second TTI duration being greater than the first duration;
apply the ON-OFF mask to start concurrently with an end of the second set of TTIs; and
transmit a second uplink transmission during the second set of TTIs.

28. A non-transitory computer-readable medium storing code for wireless communication, the code comprising instructions executable by a processor to:
identify a first transient period between a transmit OFF power and transmit ON power for a wireless transmitter, the first transient period identified for a first transmission time interval (TTI) for an uplink transmission of the wireless transmitter, the first TTI having a first duration that is shorter than a threshold duration;

identify a second transient period between the transmit ON power and transmit OFF power for the wireless transmitter, wherein a duration of the first transient period, the second transient period, or both is a function of frequency bandwidth of the uplink transmission, and wherein one or both of the first transient period or the second transient period has a longer duration for a first frequency bandwidth for the uplink transmission than for a second frequency bandwidth for the uplink transmission based at least in part on a transmission bandwidth of the uplink transmission satisfying a transmission bandwidth threshold and based at least in part on the function of frequency bandwidth;

apply the first transient period as an OFF-ON mask that starts before a start of the first TTI;

apply the second transient period as an ON-OFF mask that ends after an end of the first TTI; and transmit the uplink transmission during the first TTI.

29. The non-transitory computer-readable medium of claim 28, wherein the threshold duration corresponds to a second duration of a second TTI for a second uplink transmission of the wireless transmitter.

30. The non-transitory computer-readable medium of claim 28, wherein the instructions are further executable by the processor to:

identify a second uplink transmission to be transmitted in a second TTI, the second TTI consecutive to the first TTI and having the first duration;

identify a third transient period between a first transmit ON power associated with the first TTI and a second transmit ON power associated with the second TTI;

apply the third transient period as a boundary time mask that spans a boundary between the first TTI and the second TTI; and transmit the second uplink transmission during the second TTI.

* * * * *